(12) United States Patent
Cao et al.

(10) Patent No.: US 10,940,758 B2
(45) Date of Patent: Mar. 9, 2021

(54) TERRAIN ASSIST APPARATUS AND RELATED METHODS FOR USE WITH VEHICLES

(71) Applicant: Ford Global Technologies, LLC, Dearborn, MI (US)

(72) Inventors: Bang Kim Cao, Northville, MI (US); Michael Edward Brewer, Dexter, MI (US); Brandon Cameron, Canton, MI (US); William Gregory Suter, Farmington Hills, MI (US); David John Messih, Troy, MI (US); Christopher Wernette, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 15/994,527

(22) Filed: May 31, 2018

(65) Prior Publication Data

US 2019/0366846 A1 Dec. 5, 2019

(51) Int. Cl.
*G06F 17/00* (2019.01)
*B60K 28/16* (2006.01)
*B60T 8/175* (2006.01)
*B60W 50/08* (2020.01)
(Continued)

(52) U.S. Cl.
CPC ............. *B60K 28/16* (2013.01); *B60T 8/175* (2013.01); *B60W 30/18172* (2013.01); *B60W 50/082* (2013.01); *B60W 50/087* (2013.01); *B60W 50/14* (2013.01); *B60W 30/18027* (2013.01); *B60W 2050/146* (2013.01); *B60W 2520/105* (2013.01); *B60W 2520/125* (2013.01); *B60W 2530/20* (2013.01); *B60W 2552/05* (2020.02); *B60W 2552/40* (2020.02)

(58) Field of Classification Search
CPC .. B60K 28/16; B60T 8/175; B60W 30/18172; B60W 50/082; B60W 50/087; B60W 50/14; B60W 2552/40; B60W 2552/05; B60W 30/18027; B60W 2050/146; B60W 2520/105; B60W 2520/125; B60W 2530/20
USPC ........................................................... 701/90
See application file for complete search history.

(56) References Cited

U.S. PATENT DOCUMENTS

| | | | | |
|---|---|---|---|---|
| 8,244,445 B2 * | 8/2012 | Luehrsen | ................ | B60T 8/175 701/82 |
| 9,037,341 B2 * | 5/2015 | James | .................... | B60W 50/14 701/34.4 |
| 9,440,659 B2 * | 9/2016 | Kelly | .................... | B60W 30/18 |

(Continued)

FOREIGN PATENT DOCUMENTS

JP 09175225 7/1997

*Primary Examiner* — Ronnie M Mancho
(74) *Attorney, Agent, or Firm* — Raymond L. Coppiellie; Hanley, Flight & Zimmerman, LLC

(57) ABSTRACT

Terrain assist apparatus and related methods for use with vehicles are disclosed. An example apparatus includes a vehicle controller configured to determine, based on vehicle sensor data, a condition of a vehicle associated with driving on sand. The vehicle controller is also to generate, via an output device, information instructing a vehicle occupant to configure a driving mode of the vehicle that is associated with controlling vehicle speed. The vehicle controller is also to control a parameter of the vehicle based on a setting of the driving mode to resolve the condition.

18 Claims, 14 Drawing Sheets

(51) Int. Cl.
*B60W 50/14* (2020.01)
*B60W 30/18* (2012.01)

(56) References Cited

U.S. PATENT DOCUMENTS 9,623,879 B2 * 4/2017 Ellis .................... B60W 50/082
9,688,279 B2 * 6/2017 Kelly .................... B60K 28/16

* cited by examiner

TERRAIN ASSIST APPARATUS AND RELATED METHODS FOR USE WITH VEHICLES

FIELD OF THE DISCLOSURE

This disclosure relates generally to vehicles and, more particularly, to terrain assist apparatus and related methods for use with vehicles.

BACKGROUND

Some vehicles provide different driving modes to assist drivers in driving. For example, when a driver enables a cruise control mode of a vehicle, an electronic control unit (ECU) communicates with one or more vehicle systems to autonomously control a speed of the vehicle. Such driving modes, when used properly by drivers, improve vehicle performance and/or comfort for vehicle occupants.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
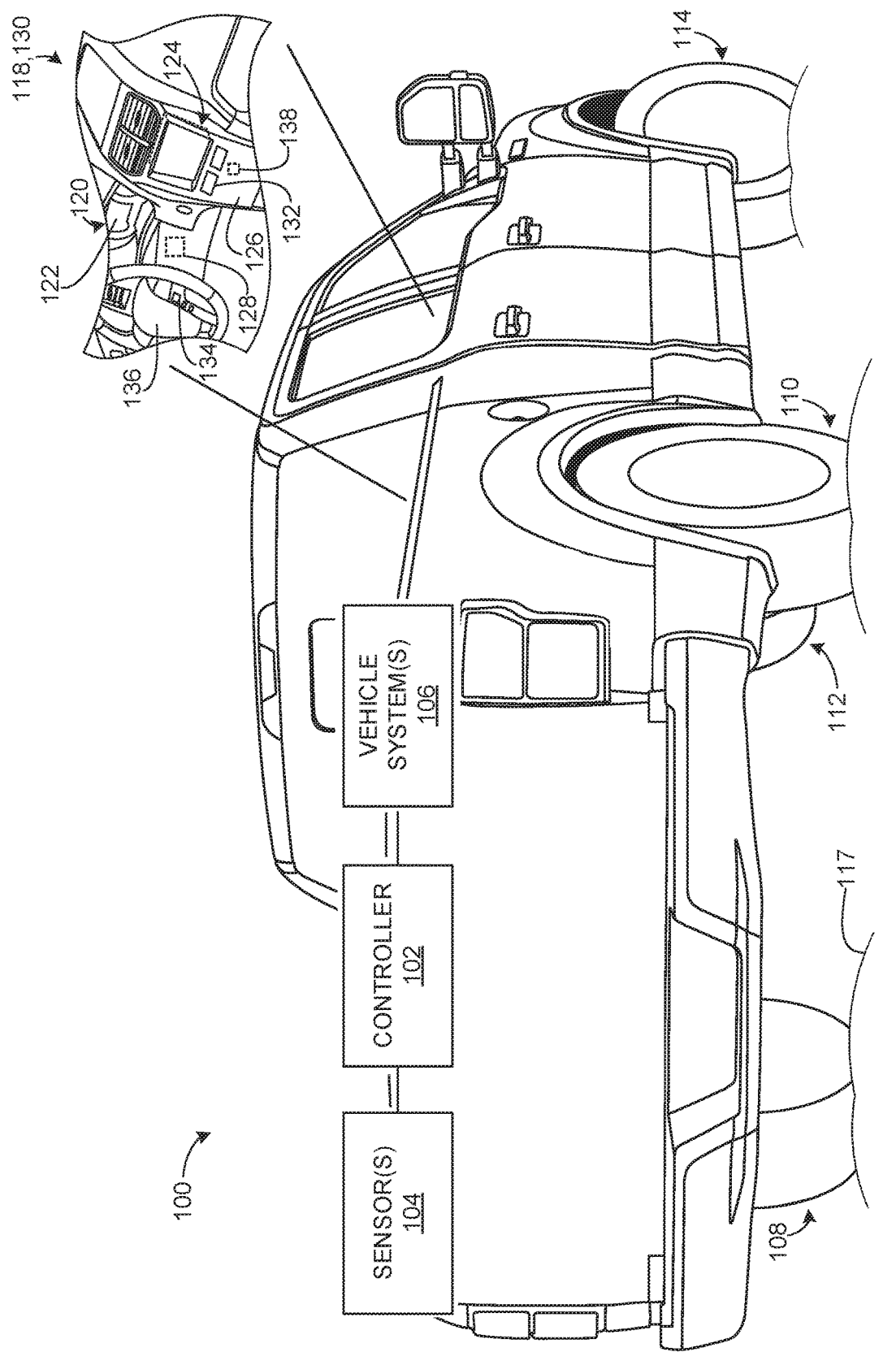
FIG. 1 is a view of an example vehicle in which examples disclosed herein may be implemented.

A driver may require assistance when driving a vehicle on sand or other loose terrain. In particular, wheels of the vehicle may sink into the sand, thereby impeding vehicle movement and/or causing the vehicle to become immobilized (e.g., stuck) in the sand. For example, when buried in the sand, the wheels slip and/or have insufficient traction to enable the vehicle to move (e.g., at an average velocity that is greater than zero).

In such instances, the driver may not know how to properly control the vehicle in a manner to free the vehicle from the sand. For example, the driver may attempt to move the vehicle by applying excessive input to a vehicle accelerator pedal, which is insufficient to free the vehicle. Instead, such excessive driver input causes the wheels to slip and/or spin at a high angular velocity and, as a result, the wheels of the vehicle may sink further below a surface of the sand. Additionally, such excessive driver input may cause damage to the vehicle. As a result, the driver may require another driver and/or vehicle (e.g., a tow truck) to help in moving and freeing the vehicle from the sand.

Terrain assist apparatus and related methods for use with vehicles are disclosed. As will be discussed in greater detail below in connection with FIGS. 1-9, 10A, 10B, 11A, 11B, and 12, examples disclosed herein enable a driver to move and/or free a vehicle that is immobilized in a particular type of terrain (e.g., sand) without requiring assistance from another driver and/or vehicle.

Some disclosed examples provide an example vehicle controller (e.g., an electronic control unit (ECU)) communicatively and/or operatively coupled to one or more systems of the vehicle such as, for example, a throttle system and/or a brake system. To free the vehicle from the terrain, the disclosed controller controls the vehicle in accordance with a particular driving mode (e.g., a driving mode associated with a speed control function, a driving mode that is associated with autonomously controlling vehicle speed such as Trail Control, etc.) of the vehicle. When the disclosed driving mode is active, the controller directs the vehicle system(s) to control one or more parameters (e.g., a velocity, a torque, a wheel angular velocity, a wheel angular acceleration, etc.) of the vehicle in accordance with a particular setting (e.g., a target vehicle speed) associated with the driving mode.

In particular, when the disclosed setting is properly configured (e.g., set to a relatively low value (e.g., about 1 mile per hour (MPH)), the controller causes one or more of the vehicle wheels to slip and/or spin in the sand (or other loose terrain) at a predetermined rate and/or within a predetermined range of rates for a predetermined time interval (e.g., about 10 minutes or less) in an effort to match the target speed of the vehicle 100 associated with the present driving mode, thereby freeing the vehicle from the sand. However, the driver may not be aware of the disclosed driving mode and/or the how to properly set, change and/or otherwise configure the disclosed setting. As such, disclosed examples generate and/or present information (e.g., visual information and/or audible information) that notifies one or more vehicle occupants to activate the driving mode and/or properly set, change, and/or otherwise configure the setting. As used herein, the term "occupant" and/or "vehicle occupant" refer(s) to a driver or a passenger of a vehicle.

Before presenting the information, the vehicle controller determines whether the driver likely requires assistance based on vehicle sensor data that indicates a particular driving condition associated with the vehicle (e.g., being substantially immobile in sand), as discussed in connection with FIGS. 2 and 9, 10A, 10B, 11A, and 11B. In particular, the controller processes the sensor data in accordance with one or more example methods to identify one or more data signatures associated with the vehicle that indicate(s) the condition(s). In response to determining to help the driver, disclosed examples generate and/or present the disclosed information.

The disclosed method(s) is/are effective in determining when the vehicle is substantially immobile (e.g., stuck) in sand opposed to other types of terrain such as mud, rocks, snow, ice, etc. As used herein, the term "substantially immobile" refers to a vehicle that is able to slightly move (e.g., jerk) on a terrain (e.g., sand) but unable to traverse the terrain (e.g., at an average velocity that is greater than zero). For example, when stuck in sand, the vehicle may jerk forward, jerk backward, yaw, etc. resulting from excessive driver input provided to an accelerator pedal of the vehicle, but the vehicle will not traverse the terrain. Some disclosed examples account for such movement(s) of the vehicle, which improves confidence or accuracy in determining the condition associated with the vehicle.

In some examples, the disclosed controller controls one or more output devices (e.g., a display associated with a dashboard (sometimes referred to as instrument panel or cluster), an audio transducer or speaker, etc.) to generate and/or present the disclosed information (e.g., see one or more of the example screens 302, 402, 502, 602, 702 depicted in FIGS. 3-7). For example, the controller controls the output device(s) to generate and/or present one or more visual indicators or notifications (e.g., a pop-up message or window) for viewing by the occupant(s) (e.g., see one or more of the example notifications 404, 504, 604, 704 depicted in FIGS. 4-7). In another example, the controller generates and/or presents one or more audible indicators and/or notifications for listening by the occupant(s) such as, for example, a chime, speech (e.g., one or more natural language phrases and/or sentences), etc.

After the vehicle occupant(s) activate the driving mode and properly configure the setting, the wheel(s) of the vehicle spin and/or slip for a predetermined time interval (e.g., about ten minutes or less) before the vehicle is enabled to traverse the terrain. However, this time interval may not be known by the occupant(s). As a result, the driver may not wait for the entire time interval while the driving mode is active and properly configured (e.g., the driver may deactivate the first driving mode and/or change the setting during the time interval). As such, in some examples, the controller controls the output device(s) to generate and/or present additional information that informs the driver of the time interval and/or instructs the driver to wait.

Figure 6:
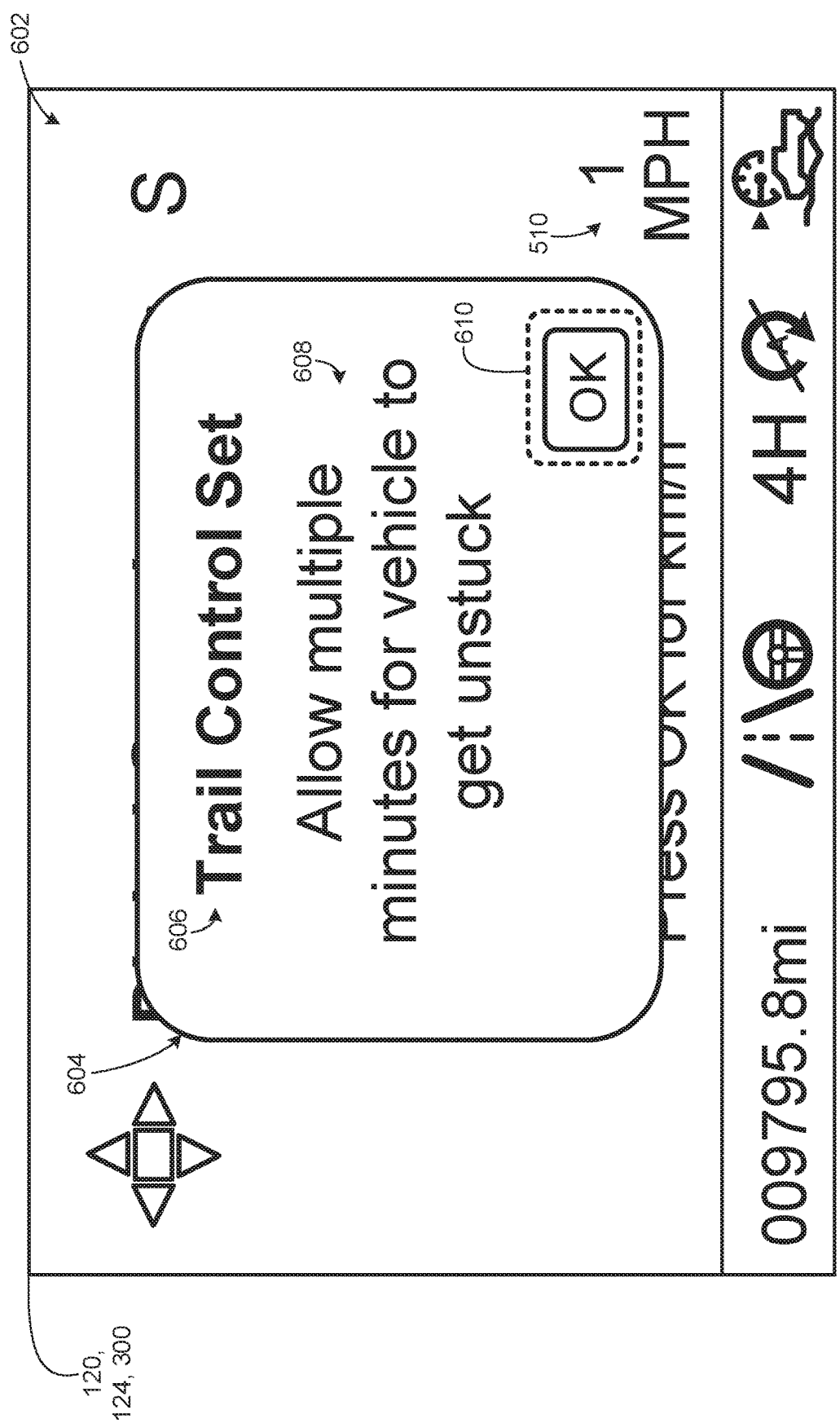
Figure 7:
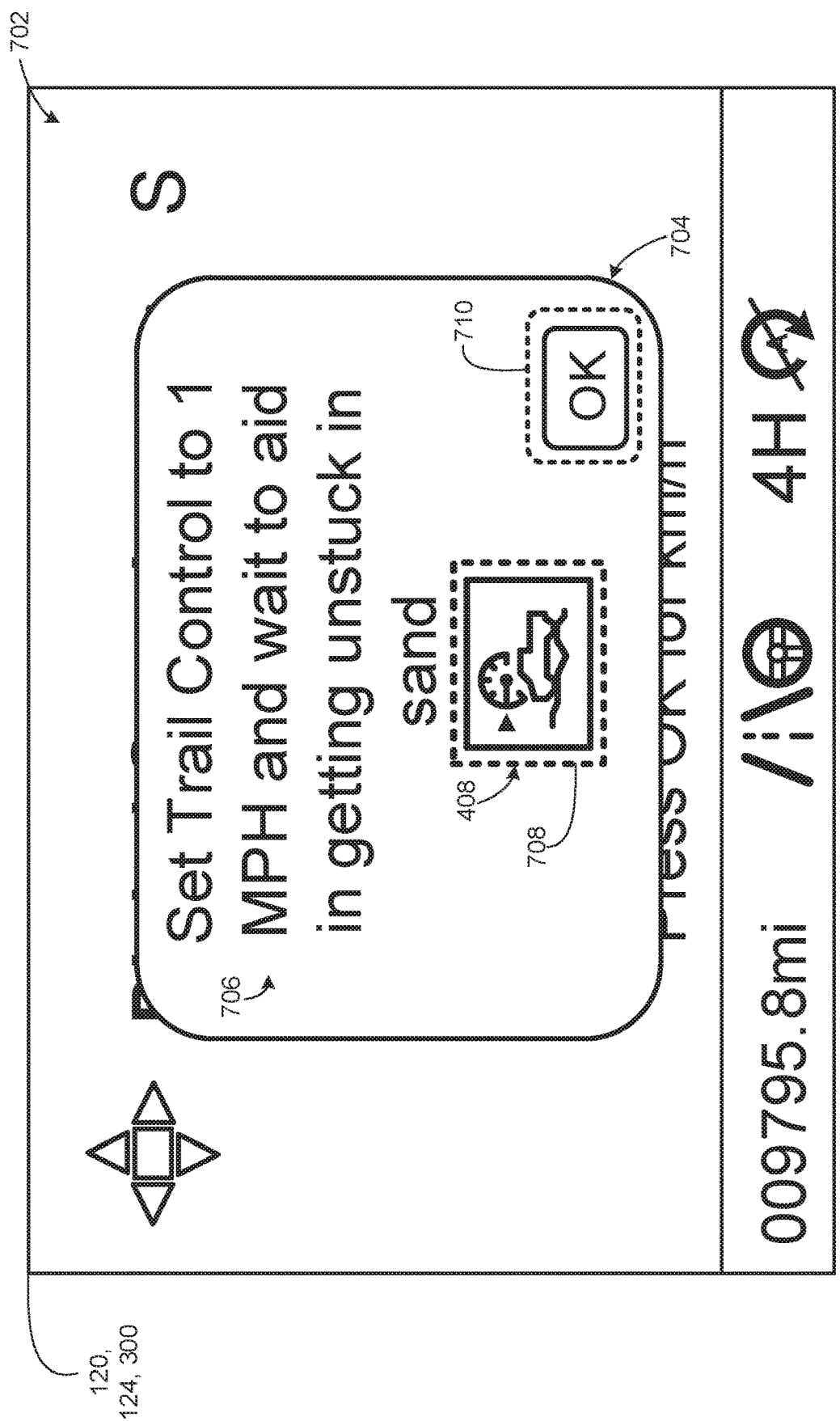

Some disclosed examples present all of the aforementioned information simultaneously (e.g., see the example fifth screen 702 depicted in FIG. 7). Some disclosed examples present different portions of the information at different times and/or in response to user input provided to the controller (e.g., see one or more of the example screens 402, 502, 602 depicted in FIGS. 4-6). In some such examples, the vehicle occupants interact with the vehicle controller (e.g., via one or more input devices such as a button, a touchscreen, etc.) in accordance with instructions conveyed by the different portions of the information. In this manner, disclosed examples train the vehicle occupant(s) how to effectively resolve the condition of the vehicle. As a result, examples disclosed herein aid the driver in properly operating the vehicle in the sand (or other loose terrain), which prevents vehicle damage that may have been otherwise been caused by the driver.

FIG. 1 is a view of an example vehicle (e.g., a truck, a sport utility vehicle (SUV), a car, etc.) 100 in which examples disclosed may be implemented. The vehicle 100 of FIG. 1 includes an example vehicle controller 102, one or more example sensors 104, and one or more example vehicle system(s) (e.g., a throttle system, a brake system, a steering system, etc.) 106, and example wheels 108, 110, 112, 114 (four of which are shown in this example) (sometimes referred to as road wheels). As will be discussed in greater detail below in connection with FIGS. 2-9, 10A, 10B, 11A, 11B, and 12, the controller 102 of the illustrated example assists a driver in properly operating and/or moving the vehicle 100 on an example driving terrain (e.g., sand, dirt, mud, rocks, snow, etc.) 116. For example, during vehicle operation, one or more of the wheels 108, 110, 112, 114 at least partially sink into and/or slip on the terrain 116, thereby impeding and/or restricting movement of the vehicle 100. In such examples, the driver may not know how to properly control parameters (e.g., e.g., a velocity, an acceleration, a torque, a wheel angular velocity, a wheel angular acceleration, etc.) of the vehicle 100 on the terrain 116 and, as a result, the vehicle 100 may become stuck and/or substantially immobile in a position on the terrain 116. In particular, the controller 102 detects such a condition of the vehicle 100 and, in response, notifies the occupant(s) (e.g., the driver) of the vehicle 100 how to resolve the condition.

To free the vehicle 100 and/or otherwise enable the vehicle 100 to traverse the terrain 116 when stuck, the controller 102 communicates with and/or directs the vehicle system(s) 106 to control one or more parameters (e.g., a velocity, an acceleration, a torque, a wheel angular velocity, a wheel angular acceleration, etc. of the vehicle 100. In some examples, the controller 102 of FIG. 1 controls the wheels 108, 110, 112, 114 via the vehicle system(s) 106 in accordance with one or more driving modes of the vehicle (e.g., stored in a memory of the controller 102) that is/are active and/or properly configured (e.g., by one or more vehicle occupants). In particular, based on the active driving mode(s) and/or one or more settings thereof, the controller 102 causes the vehicle 100 to travel at a predetermined velocity and/or within a predetermined range of velocities (e.g., between 1 MPH and 3 MPH, etc.). Additionally or alternatively, the controller 102 can cause the wheel(s) 108, 110, 112, 114 to spin at a predetermined rate and/or within a predetermined range of rates for a predetermined time interval (e.g., about 10 minutes or less), thereby freeing the vehicle 100.

In some examples, the predetermined time interval associated with freeing the vehicle 100 is based on one or more characteristics associated with the vehicle 100 (e.g., one or more of a tire type, a tire tread type, a vehicle weight, etc.), one or more characteristics (e.g., a type of sand and/or moisture content thereof) associated with the terrain 116, a depth to which one or more of the wheel(s) 108, 110, 112, 114 of the vehicle 100 are buried in the terrain 116 relative to a surface 117 of the terrain 116, and/or angular velocities of the respective wheels 108, 110, 112, 114.

According to the illustrated example of FIG. 1, a first example driving mode (e.g., Trail Control, a mode associated with a speed control function, etc.) of the vehicle 100 is associated with a first driving characteristic relating to speed of the vehicle 100. When active and/or properly configured, the controller 102 causes one or more (e.g., all) of the wheels 108, 110, 112, 114 to spin or rotate at the predetermined rate and/or within the predetermined range of rates (e.g., without the driver providing input to a vehicle accelerator (e.g., a gas pedal) and/or a brake pedal). In particular, the rate(s) at which the wheel(s) 108, 110, 112, 114 spin and/or slip on the terrain 116 is based on a first example setting (e.g., a target speed) of the first driving mode. As such, to free the vehicle 100 from the position on the terrain 116, the first setting is set (e.g., by a vehicle occupant) to a predetermined value (e.g., a relatively low value of speed such as about 1 MPH) and/or within a predetermined range of values (e.g., between about 1 MPH and about 3 MPH) that corresponds to the respective predetermined rate and/or the predetermined range of rates.

However, the driver may not be aware of the first driving mode and/or may not know how to properly configure the first setting.

According to the illustrated example of FIG. 1, the controller 102 notifies one or more occupants (e.g., a driver and/or one or more passengers) of the vehicle 100 how to properly control and/or operate the vehicle 100 in a manner that frees the vehicle 100 from the terrain 116 and/or enable the vehicle 100 to traverse the terrain 116. In particular, the controller 102 communicates with and/or directs one or more output devices (e.g., one or more light-emitting diodes, a liquid crystal display, a touchscreen, an audio transducer or speaker, etc.) 118 to present visual information and/or audible information to the occupant(s).

In some examples, the controller 102 controls a first example display 120 in the vehicle 100 to present one or more images and/or a video (e.g., a pop-up message or window, text or characters, symbols, etc.). The first display 120 of FIG. 1 is disposed on an example dashboard (e.g., a digital dashboard) 122 (sometimes referred to as instrument panel or cluster) of the vehicle 100, which facilitates viewing by a driver. In some examples, the controller 102 similarly controls a second example display 124 in the vehicle 100 to similarly generate and/or present one or more images and/or a video. The second display 124 of FIG. 1 is disposed on an example console 126 of the vehicle 100, which facilitates viewing by the driver and/or a vehicle passenger.

Additionally or alternatively, in some examples, the controller 102 controls one or more example sound sources (e.g., an audio transducer or speaker) 128 (one of which is shown) to generate sound such as, for example, a chime and/or speech (e.g., one or more natural language phrases and/or sentences).

The controller 102 of FIG. 1 receives data and/or commands from the vehicle occupant(s) via one or more input devices (e.g., a button, a switch, a keyboard, a mouse, a microphone, a camera, a touchscreen, etc.) 130 in the vehicle 100. For example, a first example button 132 is operatively coupled to the console 126 to receive user input. In another example, one or more example steering wheel buttons 134 (three of which are shown) are operatively coupled to an example steering wheel 136 of the vehicle 100. Additionally or alternatively, in some examples, the second display 124 is implemented as a touchscreen such that a vehicle occupant can similarly provide data and/or commands to the controller 102 by touching and/or interacting with the second display 124. In particular, when pressed and/or otherwise interacted with, the input device(s) 124, 130, 132, 134 of FIG. 1 activate or deactivate the first driving mode of the vehicle 100 (and/or one or more other vehicle driving modes). Further, in some examples, the input device(s) 124, 130, 132, 134 set, change, and/or otherwise configure one or more settings of the first driving mode in response to user input provided thereto.

While the example of FIG. 1 depicts the example input devices 124, 130, 132, 134, other disclosed examples can advantageously use one or more other input devices to similarly receive user inputs and/or selections. Further, in some examples, the controller 102 receives data and/or commands from a vehicle occupant via an example microphone 138 disposed in the vehicle 100.

The controller 102 of FIG. 1 is communicatively coupled to the vehicle 100, the sensor(s) 104, the vehicle system(s) 106, the example output devices 118, 120, 124, 128, and the example input devices 124, 130, 132, 134, 138 (e.g., via one or more signal transmission wires or busses, radio frequency, etc.). In some examples, the controller 102 is implemented using one or more electronic control units (ECUs).

To measure and/or detect one or more parameters associated with the vehicle 100, the sensor(s) 104 of FIG. 1 include, but is/are not limited to, a wheel speed sensor, a wheel acceleration sensor, a torque sensor (e.g., operatively coupled to a vehicle axle and/or a vehicle wheel), a yaw rate sensor, an accelerometer, a position sensor (e.g., operatively coupled to throttling valve and/or a vehicle accelerator), etc. In some examples, the controller 102 measures and/or detects an acceleration of one or more of the wheels 108, 110, 112, 114 and/or a vehicle axle via the sensor(s) 104. In some examples, the controller 102 measures and/or detects a deceleration of one or more of the wheels 108, 110, 112, 114 and/or a vehicle axle via the sensor(s) 104. In some examples, the controller 102 measures and/or detects an acceleration (e.g., a longitudinal acceleration) of the vehicle 100 via the sensor(s) 104. In some examples, the controller 102 measures and/or detects a yaw rate of the vehicle 100 via the sensor(s) 104.

In some examples, the controller 102 of FIG. 1 determines when the driver is attempting to move and/or otherwise free the vehicle 100 from the terrain 116. For example, the controller 102 detects a requested acceleration of the vehicle 100 via the sensor(s) 104 in response to the driver and/or controller providing input to a vehicle accelerator. That is, in some examples, a requested acceleration of the vehicle 100 includes a change in position of the vehicle accelerator pedal. Such positional changes are indicative of whether the driver and/or controller of the vehicle 100 is attempting to move the vehicle 100. Additionally or alternatively, in some examples, the controller 102 determines when a driver and/or a controller is attempting to move and/or free the vehicle 100 based on other suitable sensor data of the vehicle 100.

Figure 2:
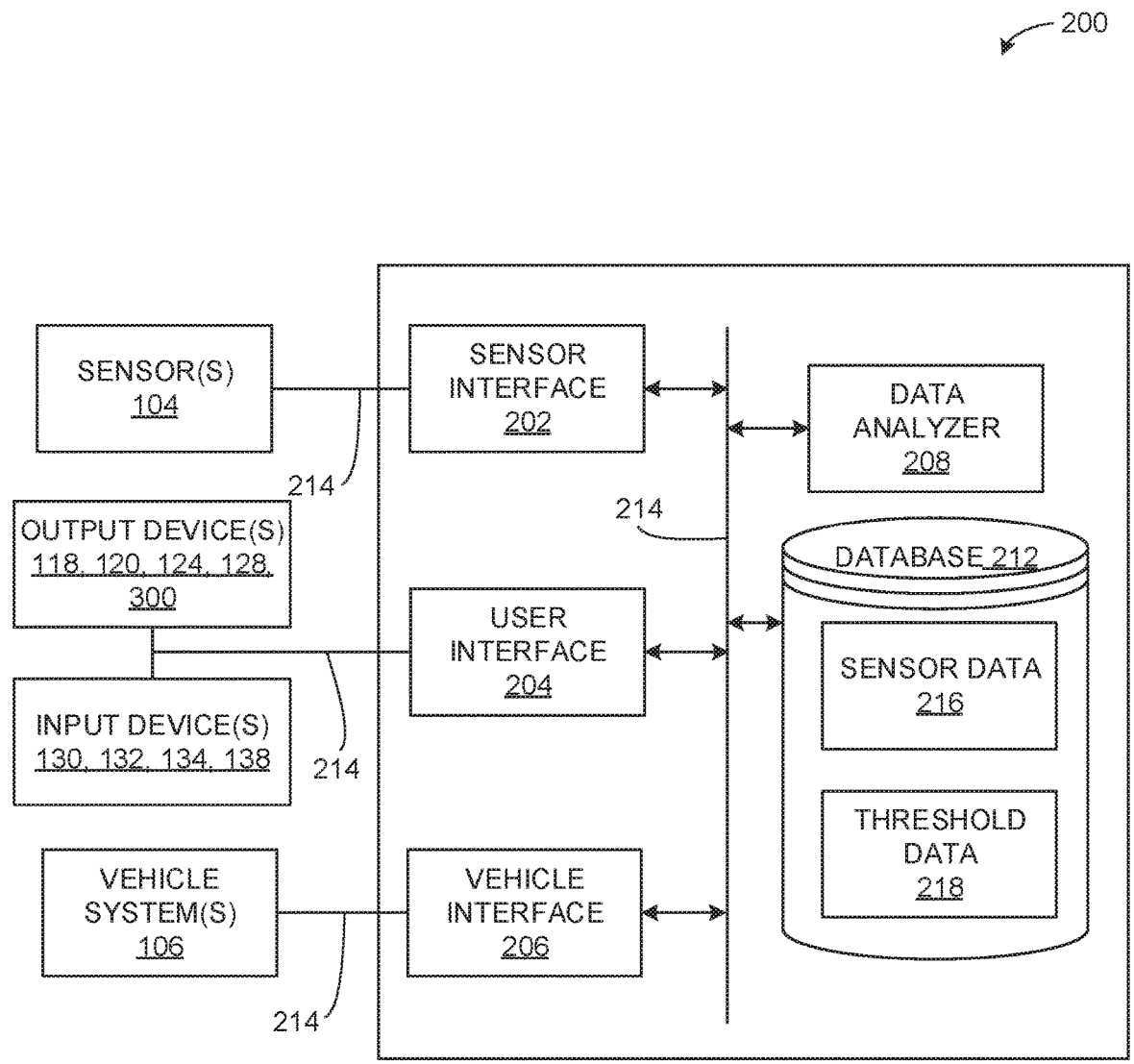
FIG. 2 is a block diagram of an example terrain assist system in accordance with the teachings of this disclosure.

FIG. 2 is a block diagram of an example terrain assist system 200 in accordance with the teachings of this disclosure. In some examples, the terrain assist system 200 of FIG. 2 is implemented by the controller 102 of FIG. 1. The terrain assist system 200 of FIG. 2 includes an example sensor interface 202, an example user interface 204, an example vehicle interface 206, an example data analyzer 208, and an example database 212. In the example of FIG. 2, the vehicle terrain assist system 200 is communicatively coupled to the sensor(s) 104 of FIG. 1, the vehicle system(s) 106 of FIG. 1, the output devices 118, 120, 124, 128 of FIG. 1, the input devices 124, 130, 132, 134, 138 of FIG. 1, and the output device 300 of FIG. 3 via one or more communication links (e.g., one or more signal transmission wires or busses, radio frequency, etc.) 214.

The example vehicle interface 206 provides data, control or command signals, and/or power to the vehicle system(s) 106 to control one or more parameters of the vehicle 100 in accordance with the aforementioned first driving mode of the vehicle 100 (e.g., when the first driving mode is active) and/or one or more other driving modes of the vehicle 100 (e.g., when the respective one or more other driving modes is/are active). In some examples, when the first setting is active, the vehicle interface 206 directs the vehicle system(s) 106 to maintain control of one or more parameters (e.g., a velocity, a torque, a wheel angular velocity, a wheel angular acceleration, etc.) of the vehicle 100 in accordance with the first setting of the first driving mode. In particular, when the first setting is set to the predetermined value (e.g., relatively low value that is about 1 MPH) and/or the predetermined range of values (e.g., between about 1 MPH and about 3

MPH), the vehicle interface 206 causes one or more of the wheels 108, 110, 112, 114 to spin at the predetermined rate and/or within the predetermined range of rates.

In some examples, based on the first setting of the first driving mode, the vehicle interface 206 directs the vehicle system(s) 106 to change a position of a vehicle accelerator, thereby changing (e.g., increasing) axle torque and/or wheel acceleration of the vehicle 100. In some examples, based on the first setting of the first driving mode, the vehicle interface 206 directs the vehicle system(s) 106 to change a brake fluid pressure of the vehicle 100, thereby changing (e.g., increasing) wheel deceleration of the vehicle 100.

The user interface 204 of FIG. 2 facilitates interactions and/or communications between one or more end users (e.g., a driver and/or a passenger of the vehicle 100) and the example terrain assist system 200. In some examples, the user interface 204 is communicatively coupled, via the communication link(s) 214, to the input device(s) 130, 132, 134, 138 to enable the end user(s) to input data, commands, selections, etc. to the terrain assist system 200.

In some examples, the user interface 204 is communicatively coupled, via the communication link(s) 214, to the output device(s) 118, 120, 124, 128, 300 to generate and/or present information and/or data to the user(s) (e.g., when the data analyzer 208 determines that the driver requires assistance in moving the vehicle 100). For example, the terrain assist system 200 presents one or more images and/or video (e.g., a pop-up window, text or characters, etc.) via the display(s) 120, 124, 300. In another example, the terrain assist system 200 presents one or more sounds (e.g., a chime, speech, etc.) via the microphone 128.

The sensor interface 202 of FIG. 2 is communicatively coupled to the sensor(s) 104 via the communication link(s) 214 to receive sensor data 216 therefrom. That is, in some examples, the sensor(s) 104 generate at least a portion of the sensor data 216 in the database 212.

In some examples, the terrain assist system 200 receives example sensor data 216 via the sensor(s) 104 before, during, and/or after a requested acceleration of the vehicle 100. In some examples, the sensor data 216 includes and/or indicates an acceleration (e.g., a longitudinal acceleration) of the vehicle 100 and/or an acceleration (e.g., an angular acceleration) of one or more of the wheels 108, 110, 112, 114. In some examples, the sensor data 216 includes and/or indicates a deceleration of one or more of the wheels 108, 110, 112, 114. In some examples, the sensor data 216 includes and/or indicates a wheel speed (e.g., angular velocity) of one or more of the wheels 108, 110, 112, 114. In some examples, the sensor data 216 includes and/or indicates a yaw rate of the vehicle 100. In some examples, the sensor data 216 includes and/or indicates a standstill state (e.g., a value that is true or false) of the vehicle 100.

The database 212 of FIG. 2 stores and/or provides access to data associated with the vehicle 100 of FIG. 1 and/or the terrain assist system 200. For example, the database 212 receives data from and/or transmits data to (e.g., via communication link(s) 214) one or more of the sensor interface 202, the user interface 204, the vehicle interface 206, and/or the data analyzer 208. Additionally, in some examples, the database 212 stores or saves one or more of the sensor data 216 and/or threshold data 218. In some examples, the database 212 saves or stores one or more driving modes of the vehicle 100 and/or one or more settings of the respective driving mode(s).

The threshold data 218 and the sensor data 216 of FIG. 1 enable the data analyzer 208 to determine one or more conditions (e.g., being substantially immobile in sand) associated with the vehicle 100, as discussed below. In some examples, the threshold data 218 is predetermined and/or calculated by the data analyzer 208. In some examples, the threshold data 218 includes a threshold axle torque (e.g., a value representing a torque of a vehicle axle). In some examples, the threshold data 218 includes an example threshold wheel acceleration (e.g., a value representing an acceleration of one or more of the wheels 108, 110, 112, 114). In some examples, the threshold data 218 includes an example threshold wheel deceleration (e.g., a value representing a deceleration of one or more of the wheels 108, 110, 112, 114). In some examples, the threshold data 218 includes an example threshold longitudinal acceleration (e.g., a value representing a longitudinal acceleration of the vehicle 100).

To determine when a driver of the vehicle 100 likely requires assistance, the terrain assist system 200 processes (e.g., via the data analyzer 208) the sensor data 216 and/or threshold data 218 (e.g., stored in the database 212), as discussed in further detail below in connection with FIGS. 9, 10A, 10B, 11A, and 11B. In particular, the data analyzer 208 processes the data 216, 218 in accordance with one or more example methods to determine the condition(s) associated with the vehicle 100. In some examples, the data analyzer 208 determines a type (e.g., sand) of the terrain 116 and/or whether the vehicle 100 is substantially immobile in the terrain 116.

In some examples, to implement the disclosed method(s), the data analyzer 208 determines which driving mode(s) of the vehicle 100 is/are active or enabled. For example, the data analyzer 208 determines whether a second example driving mode (e.g., 4×4) of the vehicle 100 is active. In such examples, the second example driving mode (e.g., 4×4) is associated with a second driving characteristic, different from the first driving characteristic, relating to four-wheel drive functionality of the vehicle 100. When activated, the vehicle interface 206 controls the vehicle system(s) 106 in accordance with the second driving mode to generate torque at each wheel 108, 110, 112, 114 in response to driver input.

In particular, when active, the second driving mode increases the effectiveness of the first driving mode in freeing the vehicle 100 from the terrain 116 (e.g., reduces the time required to free the vehicle 100). Additionally, the second driving mode, when active, indicates that the vehicle 100 is likely driving on a rough terrain such as sand. As such, in some examples, the data analyzer 208 waits to carry out the method(s) until the second driving mode is active. In other examples, the data analyzer 208 performs the method(s) when the second driving mode is inactive and/or otherwise does not wait.

In some examples, to implement the method(s), the data analyzer 208 identifies and/or determines a standstill state of the vehicle 100, which indicates whether the vehicle 100 is traversing the terrain 116 (e.g., at an average velocity that is greater than zero). In particular, the standstill state of the vehicle 100 is based on a wheel speed or velocity (e.g., an average angular velocity of one or more of the wheels 108, 110, 112, 114) associated with the vehicle 100. As such, in some examples, the data analyzer 208 determines the standstill state of the vehicle 100 based on a measured and/or detected parameter of the vehicle 100 in the sensor data 216. In some examples, the standstill state input is provided (e.g., via an ECU) to the terrain assist system 200 from control area network (CAN) bus associated with the vehicle 100.

In some examples, the data analyzer 208 identifies a longitudinal acceleration in the sensor data 216 that corresponds to the standstill state, which is sometimes referred to as a baseline longitudinal acceleration. The baseline longitudinal acceleration is based on and/or accounts for an example angle (e.g., a pitch of the vehicle 100) defined by an orientation of the vehicle 100 on the terrain 116. The baseline longitudinal acceleration is effective in determining an example reset condition associated with the disclosed method(s), as discussed further below.

In some examples, to implement the method(s), the data analyzer 208 detects one or more requested accelerations of the vehicle 100, which indicate that the driver may be attempting to free the vehicle 100 (or driving normally). For example, in response to driver input (e.g., pressing a vehicle accelerator) provided to the vehicle 100, the data analyzer 208 determines a resulting requested acceleration is occurring or has occurred based on a respective portion of the sensor data 216. In particular, portions of the senor data 216 that occurred during and/or after a vehicle requested acceleration facilitate determining the condition(s) of the vehicle 100.

During and/or after an example requested acceleration of the vehicle 100, the data analyzer 208 identifies and/or determines one or more vehicle parameters based on a resulting portion of the sensor data 216. In some examples, the data analyzer 208 identifies an axle torque in the sensor data 216 that occurred during and/or after a requested acceleration of the vehicle 100. In some examples, the data analyzer 208 identifies a wheel acceleration that occurred during a requested acceleration of the vehicle 100. For example, based on the data 216, the data analyzer 208 identifies one or more angular accelerations of the respective one(s) of the wheels 108, 110, 112, 114. In some examples, the data analyzer 208 identifies a wheel deceleration that occurred after a requested acceleration of the vehicle 100. For example, based on the data 216, the data analyzer 208 identifies one or more angular accelerations of the respective one(s) of the wheels 108, 110, 112, 114.

In some examples, to implement the disclosed method(s), the data analyzer 208 performs one or more comparisons of the sensor data 216 to the threshold data 218. In particular, the data analyzer 208 compares one or more parameters of the vehicle 100 to one or more respective thresholds to determine whether a parameter is above or below a threshold, a degree to which a threshold is exceeded, etc.

In some examples, the data analyzer 208 compares an axle torque (e.g., that occurred during a requested acceleration) of the vehicle 100 to a first example threshold (e.g., a value representing a particular torque) and a wheel acceleration (e.g., that occurred during a requested acceleration) of the vehicle 100 to a second example threshold (e.g., a value representing a particular angular acceleration), which indicates a type of the terrain 116 to the data analyzer 208. For example, when the axle torque and the wheel acceleration are above the respective first and second thresholds, the data analyzer 208 determines that the terrain 116 is sand. In some examples, when the axle torque is below the first threshold and the wheel acceleration is above the second threshold, the data analyzer 208 determines that the terrain 116 is different from sand (e.g., one of snow or ice). In some examples, when the axle torque is above the first threshold and the wheel acceleration is below the second threshold, the data analyzer 208 similarly determines that the terrain 116 is different from sand (e.g., asphalt, pavement, etc.).

Additionally or alternatively, in some examples, the data analyzer 208 compares a wheel deceleration (e.g., that occurred after a requested acceleration) of the vehicle 100 to a third example threshold (e.g., a value representing a particular angular deceleration), which similarly indicates whether the vehicle 100 is in sand and/or increases confidence in a determination of the condition(s) associated with the vehicle 100. For example, when the wheel deceleration is above the third threshold, the data analyzer 208 determines that the terrain 116 is sand. Accordingly, in some examples, the data analyzer 208 considers one or more (e.g., all) of the axle torque, the wheel acceleration, and the wheel deceleration when determining a condition of the vehicle 100.

In some examples, the data analyzer 208 determines that the terrain 116 is not sand when at least one of: (1) the axle torque is below the first threshold; (2) the wheel acceleration is below the second threshold; or (3) the wheel deceleration is below the third threshold.

In some examples, the data analyzer 208 performs one or more checks for example reset conditions associated with the method(s), which increases confidence or accuracy in determining the condition(s) associated with the vehicle 100 by reducing and/or eliminating false positive determinations. Such false positive determinations can be prevented by analyzing time associated with performing the method(s) and/or slight vehicle movement(s) caused by the driver providing excessive input to a vehicle accelerator when attempting to free the vehicle 100. In particular, when the data analyzer 208 detects that a reset condition occurred while performing the method(s), the data analyzer 208 repeats one or more operations of the method(s).

In some examples, a first example reset condition accounts and/or corrects for a false positive determination associated with a lapse of time in performing the method(s). For example, if the above-mentioned comparison(s) do not satisfy each of the first, second, and third thresholds within a predetermined time interval (e.g., about 20 seconds), the data analyzer 208 determines that the first reset condition has occurred. In some such examples, the data analyzer 208 generates one or more time stamps to facilitate the determination of the first reset condition. For example, the data analyzer 208 compares the time stamps to an example fourth threshold (e.g., a value representing a particular time interval), which is about 20 seconds in some examples.

In some examples, a second example reset condition accounts and/or corrects for a false positive determination based on slight and/or sudden movement(s) of the vehicle 100. For example, when the driver is attempting the free the vehicle 100 via excessive input to a vehicle accelerator, the vehicle 100 may jerk while still being unable to traverse the terrain 116. In such examples, the data analyzer 208 identifies another longitudinal acceleration in the sensor data 216 that corresponds to the sudden movement and compares the longitudinal acceleration to a fifth example threshold (e.g., a value representing a particular longitudinal acceleration), which indicates the vehicle 100 may be traversing the terrain 116. When the longitudinal acceleration is above the fifth threshold, the data analyzer 208 determines that second reset condition occurred. In some such examples, in response to the longitudinal acceleration being below the fifth threshold, the data analyzer 208 determines that the vehicle 100 is substantially immobile on the terrain 116.

In some such examples, the fifth threshold is based on the baseline longitudinal acceleration. For example, the fifth threshold includes a value representing a longitudinal acceleration that is offset relative to the baseline longitudinal acceleration. In this manner, a pitch of the vehicle 100 is accounted for that may have otherwise caused the data analyzer 208 to inadvertently identify a reset condition.

Additionally, in some examples, a third example reset condition similarly accounts and/or corrects for a false positive determination based on slight and/or sudden movement(s) of the vehicle 100. In some such examples, the data analyzer 208 identifies a yaw rate in the sensor data 216 that occurred during a requested acceleration of the vehicle 100. In particular, the data analyzer 208 compares the yaw rate to a sixth example threshold (e.g., a value representing a particular yaw rate), which indicates whether the third reset condition has occurred. For example, the data analyzer 208 determines that the third reset condition has occurred when the yaw rate is above the sixth threshold. In some such examples, in response to the yaw rate being below the sixth threshold, the data analyzer 208 determines that the vehicle 100 is substantially immobile on the terrain 116.

Additionally or alternatively, in some examples, the data analyzer 208 processes other data to prevent false positive determinations of the condition(s) of the vehicle 100 such as, for example, a brake pressure associated with the vehicle 100, global position data associated with the vehicle 100 (e.g., provided to the terrain assist system 200 via a global position system (GPS), etc.)

In some examples, when no reset conditions occur in connection with the method(s), the data analyzer 208 determines that the vehicle 100 is substantially immobile in sand.

While an example manner of implementing the terrain assist system 200 is illustrated in FIG. 2, one or more of the elements, processes and/or devices illustrated in FIG. 2 may be combined, divided, re-arranged, omitted, eliminated and/or implemented in any other way. Further, the example sensor interface 202, the example user interface 204, the example vehicle interface 206, the example data analyzer 208, the example database 212, and/or, more generally, the example terrain assist system 200 of FIG. 2 may be implemented by hardware, software, firmware and/or any combination of hardware, software and/or firmware. Thus, for example, any of the example sensor interface 202, the example user interface 204, the example vehicle interface 206, the example data analyzer 208, the example database 212, and/or, more generally, the example terrain assist system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 202, the example user interface 204, the example vehicle interface 206, the example data analyzer 208, and/or the example database 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example terrain assist system 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIGS. 3-7 illustrate a third example display 300 that shows visual information in accordance with disclosed examples. In some examples, the third display 300 of FIGS. 3-7 corresponds to the first display 120 and/or the second display 124 of FIG. 1. Accordingly, in such examples, the terrain assist system 200 controls (e.g., via the user interface 204) the third display 300 to generate and/or present one or more example screens for viewing by the occupant(s) of the vehicle 100.

Figure 3:
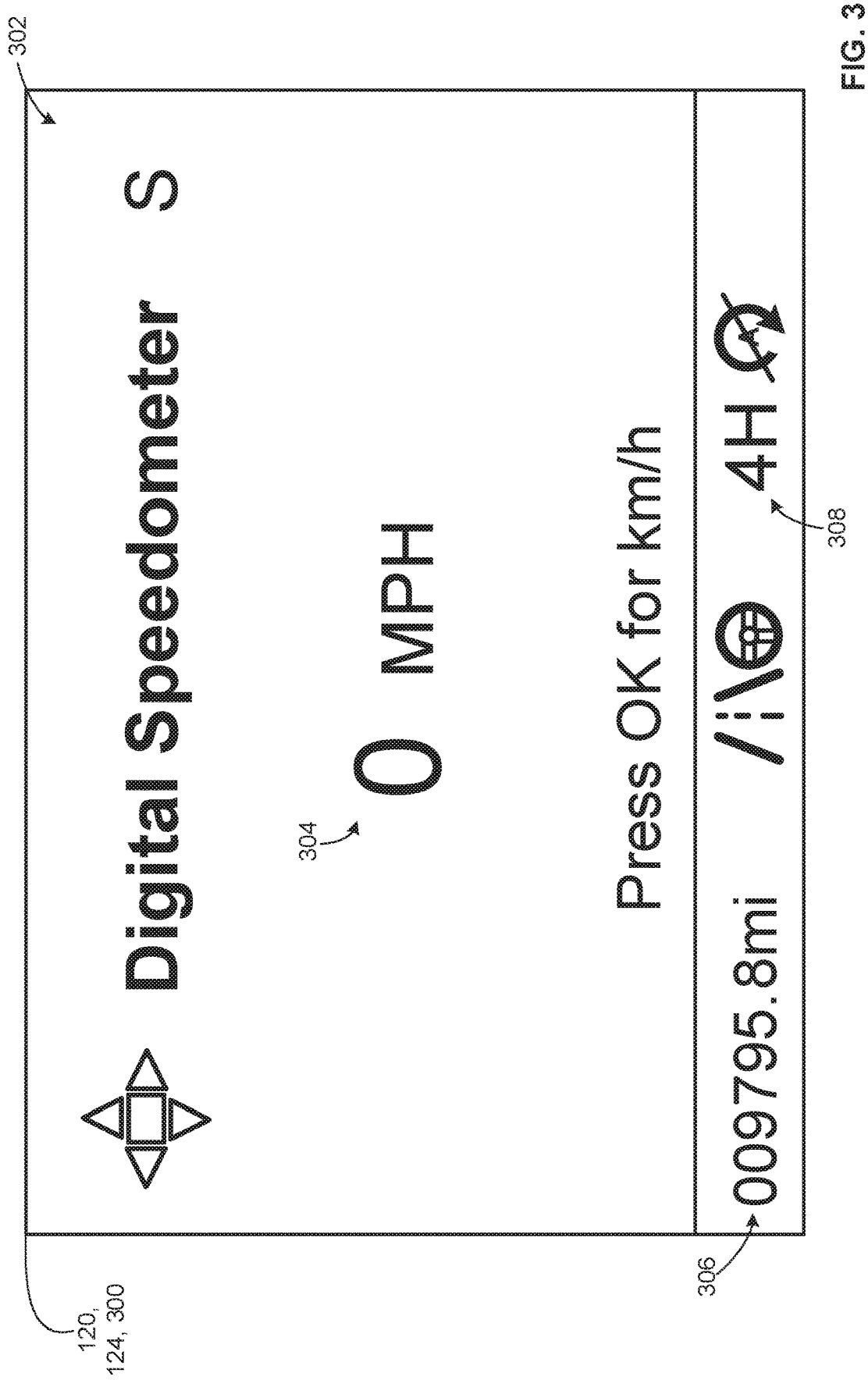
FIGS. 3-7 illustrate an example display associated with the example vehicle of FIG. 1 that shows visual information in accordance with disclosed examples.

Turning in detail to the illustrated example of FIG. 3, the terrain assist system 200 controls the third display 300 to generate and/or present a first example screen 302. The first screen 302 of FIG. 3 includes example visual information (e.g., provided by the data analyzer 208) associated with the vehicle 100 such as, for example, vehicle parameters provided by one or more instruments (e.g., one or more of a speedometer, an odometer, a tachometer, etc.) of the vehicle 100. As shown in the illustrated example of FIG. 3, the first screen 302 includes one or more data strings that represent example vehicle parameters. For example, a first example string (e.g., alphanumeric characters) 304 ("0 MPH") visually indicates a speed of the vehicle 100, which is about zero miles per hour in this example. Similarly, a second example string 306 ("009795.8 mi") visually indicates a mileage of the vehicle 100, which is about nine thousand seven hundred and ninety-six miles in this example.

The first screen 302 of the illustrated example also includes one or more icons to visually indicate which driving mode(s) of the vehicle 100 are enabled or active and/or a status of a setting of a driving mode. For example, as shown in the illustrated example of FIG. 3, a first example icon 308 indicates that the aforementioned second driving mode of the vehicle 100 is active.

Figure 4:
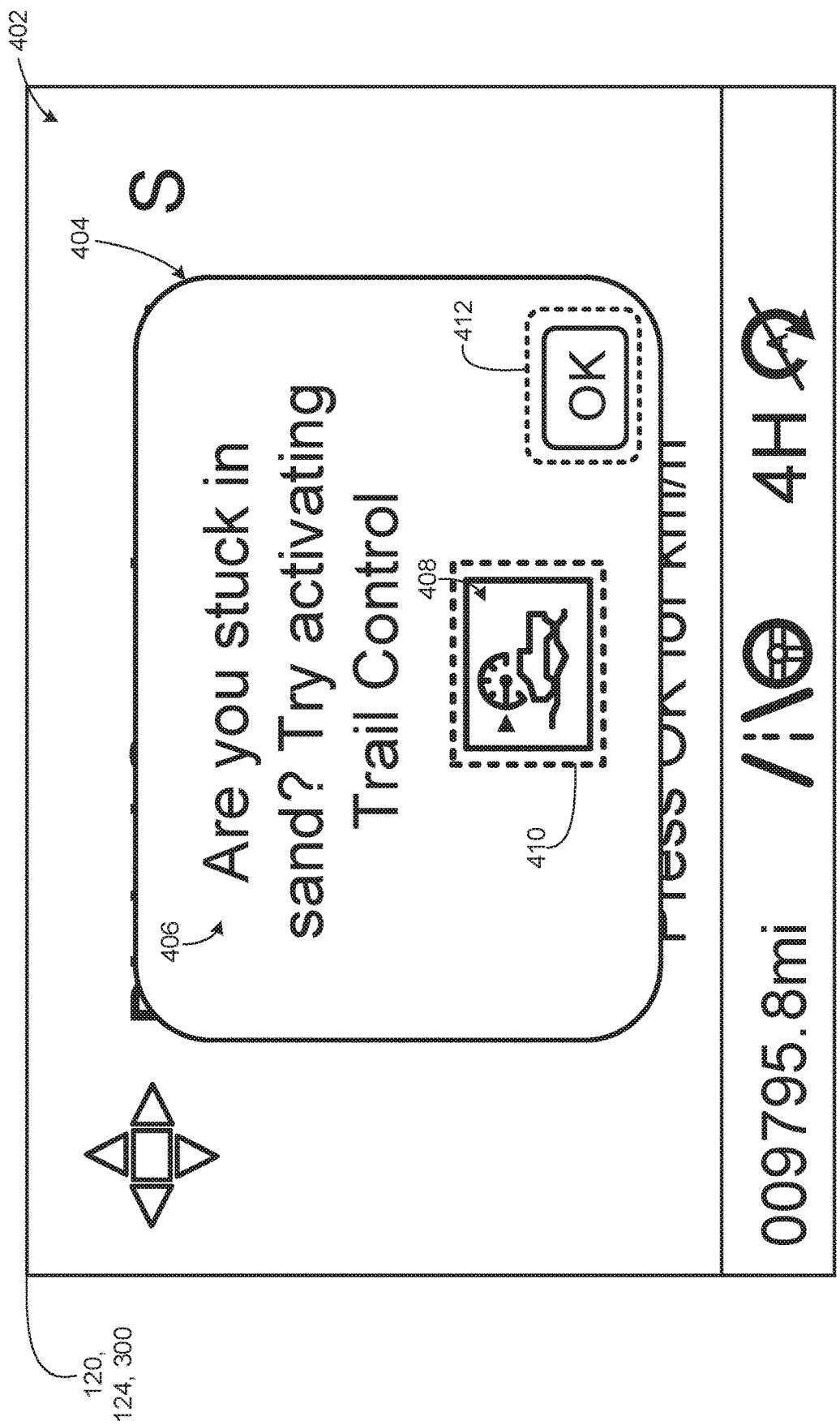

Turning in detail to the illustrated example of FIG. 4, the terrain assist system 200 controls the third display 300 to generate and/or present a second example screen 402. In some examples, the second screen 402 of FIG. 4 is presented to the vehicle occupant(s) after the first screen 302 of FIG. 3. In particular, unlike the first screen 302, the second screen 402 includes a first example visual indicator or notification (e.g., a window) 404 that informs an occupant of the vehicle 100 of a driving condition resulting from the terrain 116 and/or suggests how to resolve the condition. In particular, in response to determining that a driver of the vehicle 100 likely requires assistance, the terrain assist system 200 provides the first notification 404 (and/or one or more other visual indicators and/or audible indicators), as discussed further below.

According to the illustrated example of FIG. 4, the first notification 404 provides instructions to be carried out by the occupant(s), for example, as represented by a third example string 406 ("Are you stuck in sand? Try activating Trail Control").

As shown in the illustrated example of FIG. 4, the terrain assist system 200 controls the third display 300 to generate and/or present a second example icon 408 representing the aforementioned first driving mode of the vehicle 100. In some such examples, when presented, the second icon 408 informs the vehicle occupant(s) to provide input to (e.g., press or push) and/or interact with one or more of the input devices 124, 130, 132, 134, 138, thereby activating or enabling the first driving mode of the vehicle 100. For example, in response to a vehicle occupant pressing the first button 132 or one or more portions 410, 412 of the second screen 402 of the third display 300 (e.g., in examples where the third display 300 is implemented as a touchscreen), the terrain assist system 200 detects such user input (e.g., via the user interface 204) and, in response, activates or enables the first driving mode of the vehicle 100.

Additionally, in some examples, after providing appropriate input to one or more of the input devices 124, 130, 132, 134, 138, the terrain assist system 200 controls the third display 300 to remove and/or hide the first notification 404 and/or the visual information associated therewith from the second screen 402. For example, the terrain assist system 200 generates one or more other screens (e.g., one or more of the first screen 302, the third screen 502, the fourth screen 602, the fifth screen 702, etc.).

Figure 5:
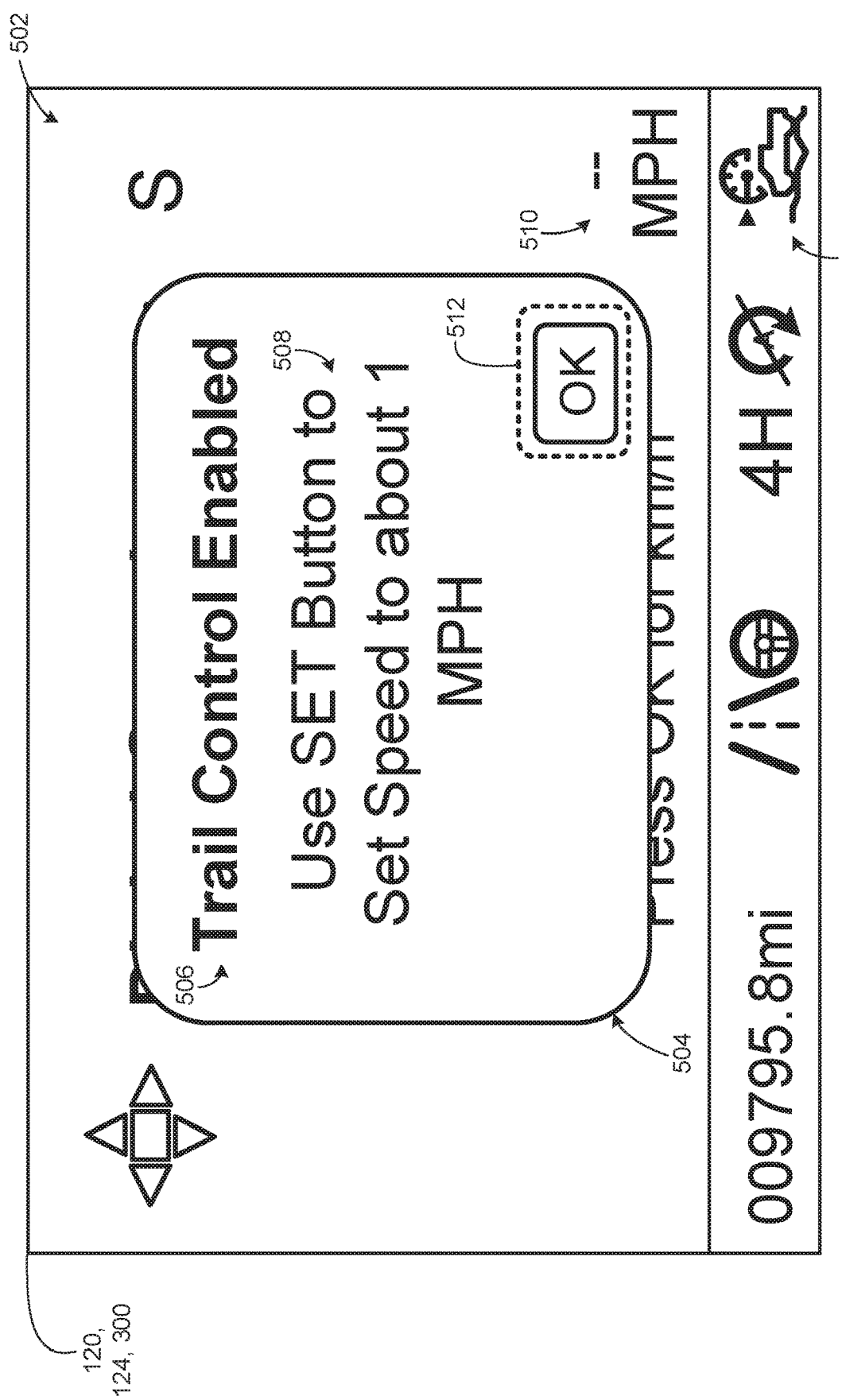

Turning in detail to the illustrated example FIG. 5, the terrain assist system 200 controls the third display 300 to generate and/or present a third example screen 502. In some examples, the third screen 502 of FIG. 5 is presented to the vehicle occupant(s) after the second screen 402 of FIG. 4. In particular, the third screen 502 includes a second example notification (e.g., a window) 504 that informs the occupant(s) of the vehicle 100 how to set, change, and/or otherwise properly configure the aforementioned first setting of the first driving mode of the vehicle 100 and/or instructs the occupant how to properly configure the first setting.

As shown in the example of FIG. 5, the second notification 504 includes a fourth example string 506 ("Trail Control Enabled") visually informing the occupant(s) that the first driving mode of the vehicle 100 is active. Additionally, the second notification 504 of FIG. 5 also includes an example fifth string 508 ("Use SET Button to Set Speed to about 1 MPH") with respect to properly configuring the first setting. For example, in response to the occupant(s) pressing and/or interacting with one or more of the steering wheel buttons 134 in accordance with the instructions represented by the fifth string 508, the terrain assist system 200 sets, changes, and/or otherwise the configures the first setting to be the aforementioned predetermined value (e.g., about 1 MPH) and/or within the aforementioned predetermined range of values (e.g., between about 1 MPH and about 3 MPH).

According to the illustrated example of FIG. 5, a bottommost and rightmost (in the orientation of FIG. 5) portion of the third screen 502 includes the second icon 408 to similarly inform the occupant(s) that the first driving mode is active. Additionally, as shown in FIG. 5, the third screen 502 includes a sixth string 510 ("- - MPH") to visually inform the occupant(s) of a status of the first setting of the first driving mode, which is not set or configured in this example.

In some examples, to remove and/or hide the second notification 504, the vehicle occupant(s) touch an example portion 512 of the third screen 502 and/or provide input to and/or interact with one or more of the other input devices 124, 130, 132, 134, 138.

Turning in detail to the illustrated example of FIG. 6, the terrain assist system 200 controls the third display 300 to generate and/or present a fourth example screen 602. In some examples, the fourth screen 602 of FIG. 6 is presented to the vehicle occupant(s) after the third screen 502 of FIG. 5. In particular, the fourth screen 602 includes a third example notification (e.g., a window) 604 that informs the occupant(s) of the aforementioned predetermined time interval associated with freeing the vehicle and/or instructs the occupant(s) to wait while the first driving mode is enabled and properly configured.

As shown in the illustrated example of FIG. 6, the third notification 604 includes a seventh example string 606 ("Trail Control Set") visually informing the occupant(s) that the first setting of the first driving mode of the vehicle 100 is properly set or configured. Additionally, the third notification 604 of FIG. 6 also includes an example eighth string 608 ("Allow multiple minutes for vehicle to get unstuck") visually informing the occupant(s) to wait.

As shown in the illustrated example of FIG. 6, the terrain assist system 200 updated the sixth string 510 to include a value (e.g., 1) representing the status of the first setting of the first driving mode (e.g., resulting from the configuration depicted in connection with FIG. 0.5). In some examples, to remove and/or hide the third notification 604, the vehicle occupant(s) touch an example portion 610 of the fourth screen 602 and/or provide input to and/or interact with one or more of the other input devices 124, 130, 132, 134, 138.

Turning in detail to the illustrated example of FIG. 7, the terrain assist system 200 controls the third display 300 to generate and/or present a fifth example screen 702. In some examples, the fifth screen 702 of FIG. 7 is generated after the first screen 302 of FIG. 3. Unlike the second screen 402 of FIG. 4, the third screen 502 of FIG. 5, or the fourth screen 602 of FIG. 6, the fifth screen 702 of FIG. 7 includes a fourth notification (e.g., a window) 704 having information with respect to the condition of the vehicle 100, enabling the first driving mode of the vehicle 100, properly configuring the first setting of the first driving mode, and waiting while the first driving mode is enabled. That is, in some examples, the terrain assist system 200 provides disclosed information via a single notification 704 or multiple notifications 404, 504, 604.

As shown in the illustrated example of FIG. 7, the fifth screen 702 includes an example ninth string 706 ("Set Trail Control to 1 MPH and wait to aid in getting unstuck in sand") representing instructions to be carried out by the vehicle occupant(s). Additionally, in this example, the fifth screen 702 includes the second icon 408 representing the first driving mode of the vehicle 100.

In some such examples, after providing appropriate input to one or more portions 708, 710 of the fifth screen 702 and/or one or more of the other input devices 124, 130, 132, 134, 138 in accordance with the instructions represented by the fourth notification 704, the terrain assist system 200 controls the vehicle 100 in accordance with the first setting of the first driving mode.

While the illustrated examples of FIGS. 4-7 depict each of the example notifications 404, 504, 604, 704 as a window (sometimes referred to as a pop-up window or message) having the example data strings 406, 506, 508, 510, 606, 608, 706, and the example icon 408 associated therewith, in other examples, one or more of the notifications 404, 504, 604, 704, one or more of the data strings 406, 506, 508, 510, 606, 608, 706, and/or the icon 408 may be implemented differently such that the vehicle occupant(s) is/are sufficiently informed and/or instructed with respect to properly configuring the first driving mode in a manner that frees the vehicle 100 from the terrain 116.

Flowcharts representative of example hardware logic or machine readable instructions for implementing the example terrain assist system 200 are shown in FIGS. 8, 9, 10A, 10B, 11A, and 11B. The machine readable instructions may be a program or portion of a program for execution by a processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 8, 9, 10A, 10B, 11A, and 11B, many other methods of implementing the example terrain assist system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 8, 9, 10A, 10B, 11A, and 11B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 8:
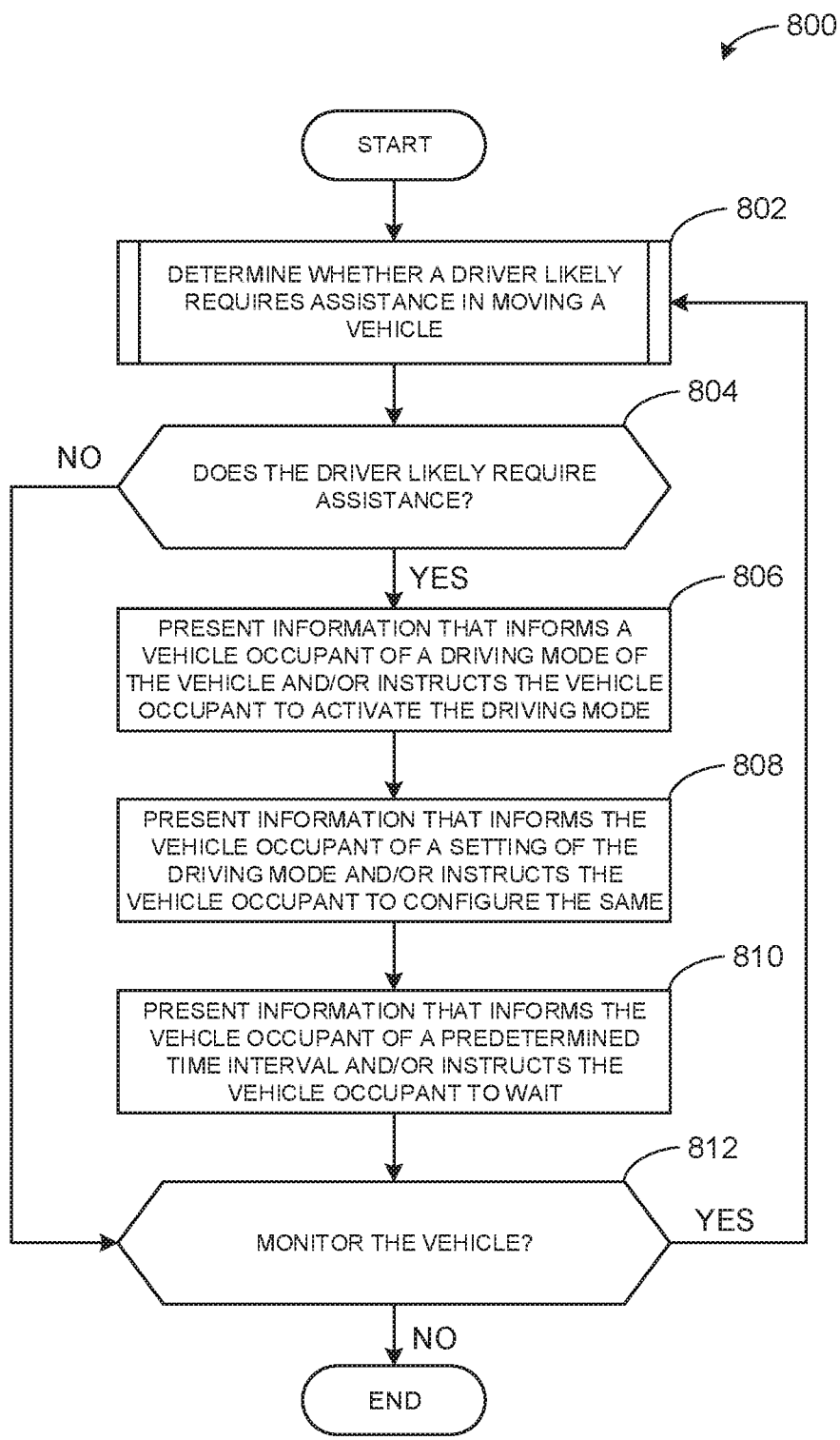
FIG. 8 is a flow diagram of an example method that may be executed to implement the example terrain assist system of FIG. 2 to assist a driver in moving a vehicle.

FIG. 8 is a flow diagram of an example method 800 that may be executed to implement the example terrain assist system 200 of FIG. 2. The example method 800 of FIG. 8 can be implemented in any of the example vehicle 100 of FIG. 1, the example controller 102 of FIG. 1, and/or the example terrain assist system 200 of FIG. 2. In particular, the example method 800 of FIG. 8 is effective in helping the driver move and/or free the vehicle 100 from the terrain 116.

The example method 800 of FIG. 8 begins by determining whether a driver likely requires assistance in moving a vehicle (block 802). In some examples, the example terrain assist system 200 of FIG. 2 determines (e.g., via the data analyzer 208) whether a driver of the vehicle 100 likely requires assistance in moving the vehicle 100. In particular, to facilitate the determination at block 802, the terrain assist system 200 identifies one or more driving conditions associated with the vehicle 100 based on the sensor data 216, which is discussed further in connection with FIGS. 9, 10A, 10B, 11A, and 11B. For example, when the terrain assist system 200 identifies a particular vehicle condition (e.g., being substantially immobile in sand), the terrain assist system 200 determines to help the driver of the vehicle 100.

In some examples, when the terrain assist system 200 determines that the driver of the vehicle 100 likely requires assistance (e.g., the particular vehicle condition is identified) (block 804: YES), control of the example method 800 proceeds to block 806. Otherwise, in some examples, if the terrain assist system 200 determines that the driver does not likely require assistance (e.g., the particular vehicle condition is not identified) (block 804: NO), control of the example method 800 proceeds to block 812.

The example method 800 of FIG. 8 also includes presenting information that informs a vehicle occupant of a driving mode of the vehicle and/or instructs the vehicle occupant to activate the driving mode (block 806). In some examples, the example terrain assist system 200 of FIG. 2 controls one or more of the output devices 118, 120, 124, 128, of FIG. 1 and/or the output device 300 of FIGS. 3-7 to generate and/or present information (e.g., visual information and/or audible information) that informs the occupant(s) of the vehicle 100 with respect to the aforementioned first driving mode (e.g., Trail Control) of the vehicle 100 and/or instructs the occupant(s) to activate the first driving mode (e.g., see the second screen 402 of FIG. 4 and/or the fifth screen of FIG. 7).

For example, the terrain assist system 200 provides the second screen 402 and/or first notification 404 for viewing by the occupant(s) of the vehicle 100 (e.g., after providing the first screen 302). In another example, the terrain assist system 200 provides the fifth screen 702 and/or the fourth notification 704 for viewing by the occupant(s) of the vehicle 100 (e.g., after providing the first screen 302).

The example method 800 of FIG. 8 also includes presenting information that informs the vehicle occupant of a setting of the driving mode and/or instructs the vehicle occupant to configure the same (block 808). In some examples, the example terrain assist system 200 of FIG. 2 controls one or more of the output devices 118, 120, 124, 128, of FIG. 1 and/or the output device 300 of FIGS. 3-7 to generate and/or present information that informs the occupant(s) of the vehicle 100 with respect to the aforementioned first setting (e.g., a target speed) of the first driving mode and/or instructs the occupant(s) to set, change, and/or otherwise properly configure the same (e.g., see the third screen 502 of FIG. 5 and/or the fifth screen 702 of FIG. 7).

For example, the terrain assist system 200 provides the third screen 502 and/or the second notification 504 for viewing by the occupant(s) of the vehicle 100 (e.g., after providing the second screen 402 and/or the first notification 404). In another example, the terrain assist system 200 provides the fifth screen 702 and/or the fourth notification 704 for viewing by the occupant(s) of the vehicle 100 (e.g., after providing the first screen 302).

The example method 800 of FIG. 8 also includes presenting information that informs the vehicle occupant of a predetermined time interval and/or instructs the vehicle occupant to wait (block 810). In some examples, the example terrain assist system 200 of FIG. 2 controls one or more of the output devices 118, 120, 124, 128, of FIG. 1 and/or the output device 300 of FIGS. 3-7 to generate and/or present information (e.g., visual information and/or audible information) that informs the occupant(s) of the vehicle 100 with respect to the aforementioned predetermined time interval (e.g., about 10 minutes or less) and/or instructs the occupant(s) to wait (e.g., see the fourth screen 602 of FIG. 6 and/or the fifth screen of FIG. 7). In some examples, the information specifically instructs the occupant(s) to wait for the predetermined time interval.

For example, the terrain assist system 200 provides the fourth screen 602 and/or the third notification 604 for viewing by the occupant(s) of the vehicle 100 (e.g., after providing the third screen 502 and/or the second notification 504). In another example, the terrain assist system 200 provides the fifth screen 702 and/or the fourth notification 704 for viewing by the occupant(s) of the vehicle 100 (e.g., after providing the first screen 302).

The example method 800 of FIG. 8 also includes determining whether to monitor the vehicle 100 (block 812). In some examples, when the example terrain assist system 200 of FIG. 2 determines to monitor the vehicle 100 (e.g., when the driver is operating the vehicle 100) (block 812: YES), control of the example method 800 of FIG. 8 returns to block 802. Otherwise, in some examples, when the terrain assist system 200 determines not to monitor the vehicle 100 (e.g., when the driver is not operating the vehicle 100) (block 812: NO), the example method 800 of FIG. 8 ends.

Figure 9:
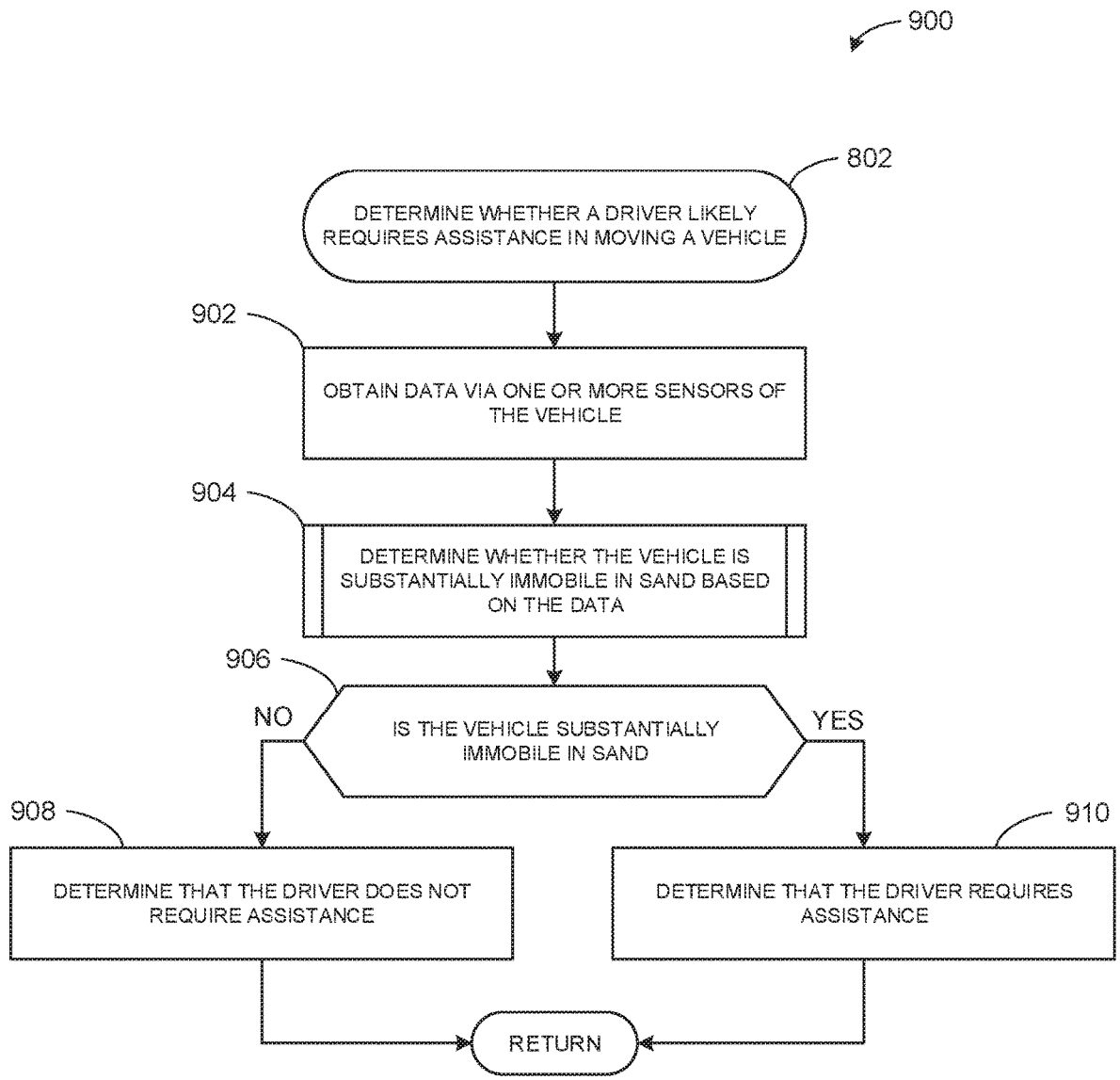
FIG. 9 is a flow diagram of an example method that may be executed to implement the example terrain assist system of FIG. 2 to determine whether a driver likely requires assistance in moving a vehicle.

FIG. 9 is a flow diagram of an example method 900 that may be executed to implement the example terrain assist system of FIG. 2. The example method 900 of FIG. 9 can be implemented in any of the example vehicle 100 of FIG. 1, the example controller 102 of FIG. 1, and/or the example terrain assist system 200 of FIG. 2. Example operations of blocks 902, 904, 906, 908, 910 may be used to implement block 802 of FIG. 8. In particular, the example method 900 of FIG. 9 is effective in determining whether the driver of the vehicle 100 likely requires assistance in moving the vehicle 100.

The example method 900 of FIG. 9 begins by obtaining data via one or more sensors of the vehicle (block 902). In some examples, the example terrain assist system 200 of FIG. 2 obtains (e.g., via the sensor interface 202) the sensor data 216 from the sensor(s) 104 of the vehicle 100. In some examples, the terrain assist system 200 stores or saves (e.g., via the database 212) at least a portion of the data 216.

The example method 900 of FIG. 9 also includes determining whether the vehicle is substantially immobile in sand based on the data (block 904). In some examples, based on at least a portion of the sensor data 216 and at least a portion of the threshold data 218, the example terrain assist system 200 of FIG. 2 determines (e.g., via the data analyzer 208) whether the vehicle 100 is substantially immobile in the terrain 116, as discussed further below in connection with FIGS. 10A, 10B, 11A, and 11B. Additionally, the terrain assist system 200 accurately determines a type (e.g., sand) of the terrain 116 on which the vehicle 100 is being operated.

In some examples, when the terrain assist system 200 determines that vehicle 100 is not in sand (block 906: NO), control of the example method 900 of FIG. 9 proceeds to block 908. Otherwise, in some examples, when the terrain assist system 200 determines that the vehicle 100 is substantially immobile in sand (block 906: YES), control of the example method 900 of FIG. 9 proceeds to block 910.

The example method 900 of FIG. 9 also includes determining that the driver does not require assistance (block 908). In some examples, based on the determination at block 906, the example terrain assist system 200 of FIG. 2 determines (e.g., via the data analyzer 208) that the driver of the vehicle 100 does not require assistance.

The example method 900 of FIG. 9 also includes determining that the driver requires assistance (block 910). In some examples, based on the determination at block 906, the example terrain assist system 200 of FIG. 2 determines (e.g., via the data analyzer 208) that the driver of the vehicle 100 requires assistance.

In some examples, after the determination at block 908 or 910, control of the example method 900 of FIG. 9 returns to the method 800 of FIG. 8.

Figure 10A:
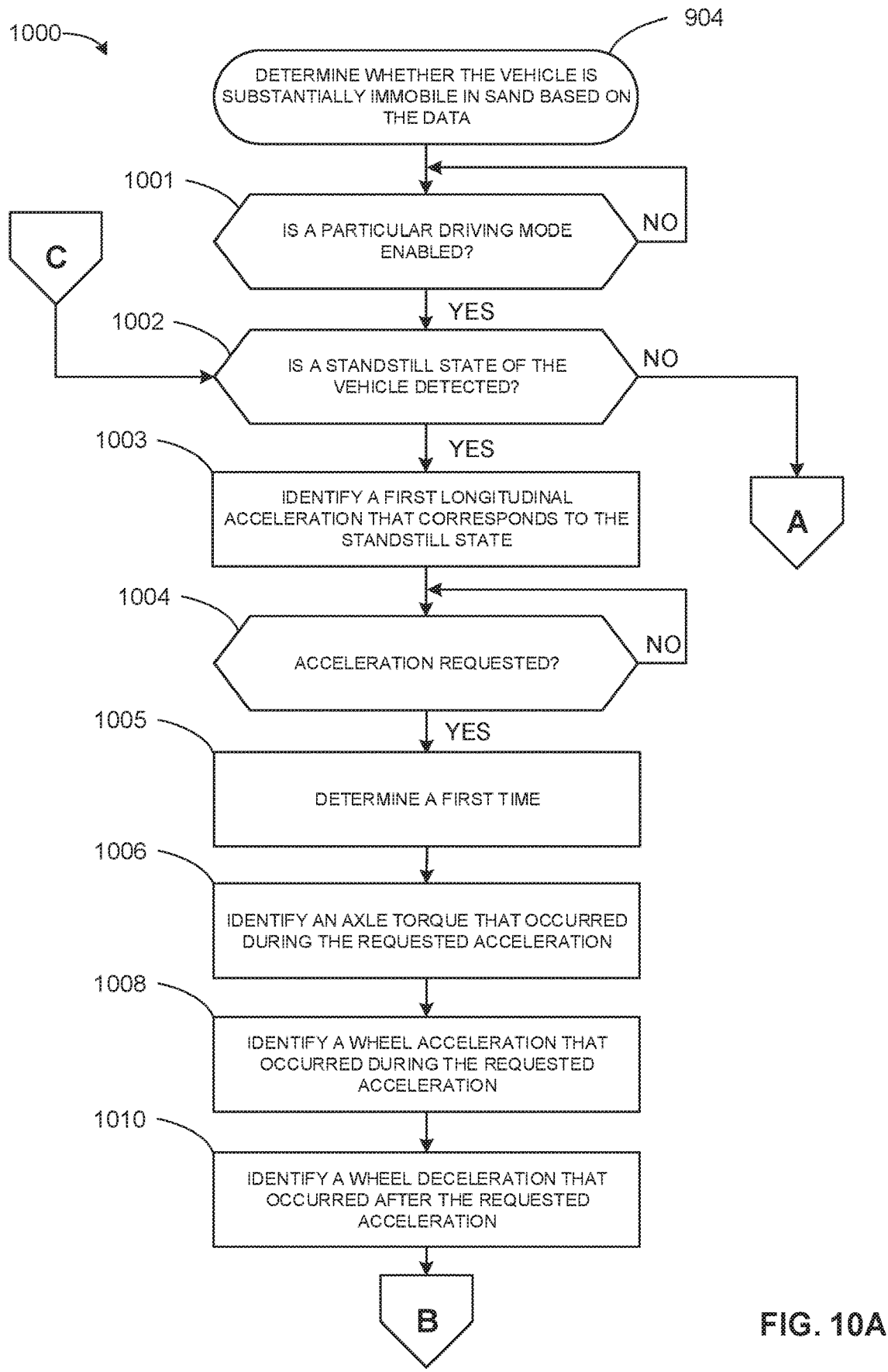
FIGS. 10A and 10B are flow diagrams of an example method that may be executed to implement the example terrain assist system of FIG. 2 to determine whether the vehicle is substantially immobile in sand based on vehicle sensor data.
Figure 10B:
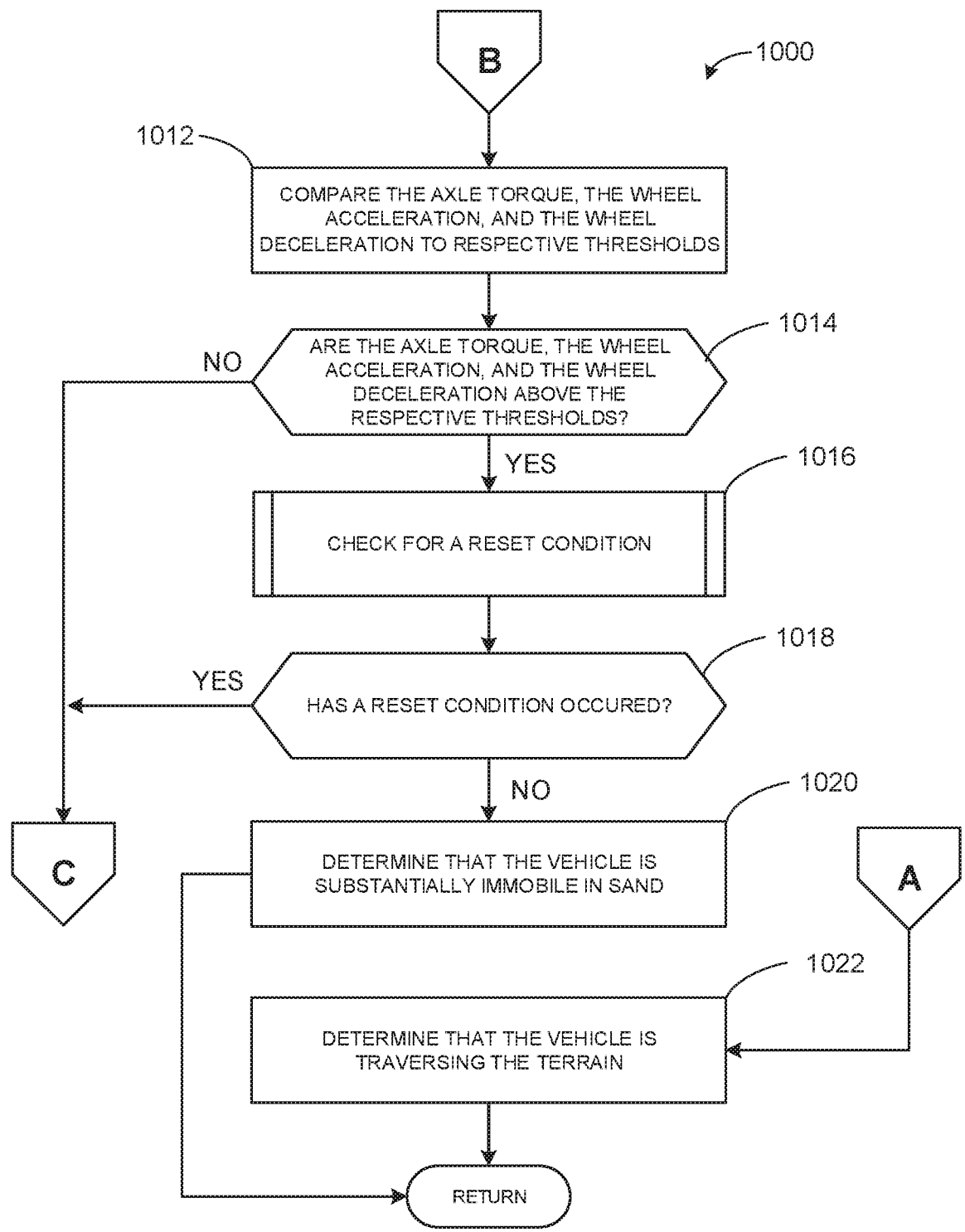

FIGS. 10A and 10B are flow diagrams of an example method 1000 that may be executed to implement the example terrain assist system of FIG. 2. The example method 1000 of FIGS. 10A and 10B can be implemented in any of the example vehicle 100 of FIG. 1, the example controller 102 of FIG. 1, and/or the example terrain assist system 200 of FIG. 2. Example operations of blocks 1001, 1002, 1003, 1004, 1005, 1006, 1008, 1010, 1012, 1014, 1016, 1018, 1020, 1022 may be used to implement block 904 of FIG. 9. In particular, the example method 1000 of FIGS. 10A and 10B is effective in determining a type of the terrain 116 and/or a particular condition of the vehicle 100 that is associated with the terrain 116.

The example method 1000 of FIGS. 10A and 10B begins by determining whether a particular driving mode is active (block 1001). In some examples, the example terrain assist system 200 of FIG. 2 determines (e.g., via the data analyzer 208) whether the aforementioned second driving mode of the vehicle 100 is active, which increases the effectiveness of the first driving mode in freeing the vehicle 100 from sand. Additionally, when active, the second driving mode indicates that the vehicle 100 is likely driving on a loose terrain such as sand.

In some examples, when the terrain assist system 200 determines that the second driving mode is active or enabled (block 1001: YES), control of the example method 1000 of FIGS. 10A and 10B proceeds to block 1002. Otherwise, in some examples, when the terrain assist system 200 determines that the second driving mode is not active or enabled (block 1001: NO), control of the example method 1000 of FIGS. 10A and 10B returns to block 1001. That is, in some examples, the terrain assist system 200 waits for the second driving mode to be enabled (e.g., by a vehicle occupant).

The example method 1000 of FIGS. 10A and 10B also includes determining whether a standstill state of the vehicle is detected (block 1002). In some examples, based on the sensor data 216, the example terrain assist system 200 of FIG. 2 determines (e.g., via the data analyzer 208) whether a standstill state of the vehicle 100 is detected, which indicates whether the vehicle 100 is traversing the terrain 116, as previously disclosed.

In some examples, when the terrain assist system 200 detects the standstill state of the vehicle 100 (block 1002: YES), control of the example method 1000 of FIGS. 10A and 10B proceeds to block 1003. Otherwise, in some examples, when the terrain assist system 200 does not detect the standstill state of the vehicle 100 (block 1002: NO), control of the example method 1000 of FIGS. 10A and 10B proceeds to block 1022.

The example method 1000 of FIGS. 10A and 10B also includes identifying a first longitudinal acceleration of the vehicle 100 that corresponds to the standstill state (block 1003). In some examples, the example terrain assist system 200 of FIG. 1 identifies (e.g., via the data analyzer 208) a first longitudinal acceleration (sometimes referred to as a baseline longitudinal acceleration) of the vehicle 100 that corresponds to the standstill state detected at block 1002 and/or stores the first longitudinal acceleration in the database 212. As previously mentioned, the first longitudinal acceleration is based on an example angle (e.g., a pitch of the vehicle 100) that is defined by an orientation of the vehicle 100 relative to the terrain 116. In particular, the first longitudinal acceleration enables the terrain assist system 200 to determine a particular reset condition associated with the example method 1000 of FIGS. 10A and 10B, as discussed in connection with FIGS. 11A and 11B.

The example method 1000 of FIGS. 10A and 10B also includes determining whether a requested acceleration is occurring or has occurred (block 1004). In some examples, based on the sensor data 216, the example terrain assist system 200 of FIG. 2 determines (e.g., via the data analyzer

208) whether a requested acceleration of the vehicle 100 is occurring or has occurred. For example, in response to driver input (e.g., resulting in movement of a vehicle accelerator) provided to the vehicle 100, the terrain assist system 200 detects the resulting requested acceleration.

In some examples, when the terrain assist system 200 determines that the requested acceleration of the vehicle 100 is occurring or has occurred (block 1004: YES), control of the example method 1000 of FIGS. 10A and 10B proceeds to block 1004. Otherwise, in some examples, when the terrain assist system 200 determines that the requested acceleration has not yet occurred (block 1004: NO), control of the example method 1000 of FIGS. 10A and 10B returns to block 1004. That is, in some examples, the terrain assist system 200 waits for a requested acceleration of the vehicle 100.

The example method 1000 of FIGS. 10A and 10B also includes determining a first time (block 1005). In some examples, in response to the determination at block 1004, the example terrain assist system 200 of FIG. 2 determines (e.g., via the data analyzer 208) a first time. For example, the example terrain assist system 200 of FIG. 2 initializes (e.g., via the data analyzer 208) a counter that ticks (e.g., counts up by 1) each time a predetermined time interval (e.g., 1 second, 30 seconds, etc.) is met. In other examples, the terrain assist system 200 generates (e.g., via the data analyzer 208) a first timestamp and/or stores the first timestamp (e.g., in the database 212) to represent the first time. In particular, the first time facilitates detecting a particular reset condition associated with the example method 1000 of FIGS. 10A and 10B.

The example method 1000 of FIGS. 10A and 10B also includes identifying an axle torque that occurred during the requested acceleration (block 1006). In some examples, based on the sensor data 216, the example terrain assist system 200 of FIG. 2 identifies (e.g., via the data analyzer 208) an axle torque associated with the vehicle 100 that occurred during the requested acceleration detected in connection with block 1004.

The example method 1000 of FIGS. 10A and 10B also includes identifying a wheel acceleration that occurred during the requested acceleration (block 1008). In some examples, based on the sensor data 216, the example terrain assist system 200 of FIG. 2 identifies (e.g., via the data analyzer 208) an acceleration (e.g., angular acceleration) associated with one or more of the wheels 108, 110, 112, 114 that occurred during the requested acceleration detected in connection with block 1004.

The example method 1000 of FIGS. 10A and 10B also includes identifying a wheel deceleration that occurred after the requested acceleration (block 1010). In some examples, based on the sensor data 216, the example terrain assist system 200 of FIG. 2 identifies (e.g., via the data analyzer 208) a deceleration (e.g., angular deceleration) associated with one or more of the wheels 108, 110, 112, 114 that occurred after the requested acceleration detected in connection with block 1004.

The example method 1000 of FIGS. 10A and 10B also includes comparing the axle torque, the wheel acceleration, and the wheel deceleration to respective thresholds (block 1012). In some examples, based on the sensor data 216 and the threshold data 218, the example terrain assist system 200 of FIG. 2 compares (e.g., via the data analyzer 208): (1) the axle torque in connection with block 1006 to a first example threshold (e.g., a value representing a particular torque); (2) the wheel acceleration in connection with block 1008 to a second example threshold (e.g., a value representing a particular angular acceleration); and (3) the wheel deceleration in connection with block 1010 to a third example threshold (e.g., a value representing a particular angular deceleration).

In particular, the axle torque and the wheel acceleration indicate a type of the terrain 116 to the terrain assist system 200. For example, when the axle torque and the wheel acceleration are above the respective first and second thresholds, the terrain assist system 200 determines that the terrain 116 is sand.

Additionally, in some examples, the wheel deceleration further indicates the type of the terrain 116 to the terrain assist system 200, which enables the terrain assist system 200 to more accurately determine when the vehicle 100 is in sand. For example, when the wheel deceleration is above the third threshold, the terrain assist system 200 determines that the terrain 116 is sand with increased confidence.

The example method 1000 of FIGS. 10A and 10B also includes determining whether the axle torque, the wheel acceleration, and the wheel deceleration are above the respective thresholds (block 1014). In some examples, based on the comparisons at block 1012, the example terrain assist system 200 of FIG. 2 determines (e.g., via the data analyzer 208) whether the axle torque of the vehicle 100 is above the first threshold, the wheel acceleration of the vehicle 100 is above the second threshold, and the wheel deceleration of the vehicle 100 is above the third threshold.

In some examples, when the terrain assist system 200 determines that the axle torque, the wheel acceleration, and the wheel deceleration are above the respective first, second, and third thresholds (block 1014: YES), control of the example method 1000 of FIGS. 10A and 10B proceeds to block 1016. Otherwise, in some examples, when the terrain assist system 200 determines that one of the axle torque, the wheel acceleration, or the wheel deceleration is below the respective one of the first, second, or third threshold (block 1014: NO), control of the example method 1000 of FIGS. 10A and 10B returns to block 1002.

The example method 1000 of FIGS. 10A and 10B also includes checking for a reset condition (block 1016). In some examples, the example terrain assist system 200 of FIG. 2 checks (e.g., via the data analyzer 208) for one or more example reset conditions that may have occurred in connection with the example method 1000 of FIGS. 10A and 10B. In some examples, the example operations of block 1016 are performed in parallel with the operations of one or more of the respective blocks 1005, 1006, 1008, 1010, 1012, 1014. In particular, the disclosed reset condition(s) aid the terrain assist system 200 in determining the condition of the vehicle 100 by reducing and/or eliminating errors associated with false positive determinations.

The example method 1000 of FIGS. 10A and 10B also includes determining whether a reset condition occurred (block 1018). In some examples, based on the check at block 1016, the example terrain assist system 200 of FIG. 2 determines (e.g., via the data analyzer 208) whether at least one example reset condition occurred in connection with the example method 1000 of FIGS. 10A and 10B.

In some examples, when the terrain assist system 200 determines that a reset condition occurred (block 1018: YES), control of the example method 1000 of FIGS. 10A and 10B returns to block 1002. Otherwise, in some examples, when the terrain assist system 200 determines that a reset condition has not occurred (block 1018: NO), control of the example method 1000 of FIGS. 10A and 10B proceeds to block 1020.

The example method 1000 of FIGS. 10A and 10B also includes determining that the vehicle is substantially immobile in sand (block 1020). In some examples, based on the determination at block 1018, the example terrain assist system 200 of FIG. 2 determines (e.g., via the data analyzer 208) that the vehicle 100 is substantially immobile in sand.

The example method 1000 of FIGS. 10A and 10B also includes determining that the vehicle is traversing the terrain (block 1022). In some examples, based on the determination at block 1002, the example terrain assist system 200 of FIG. 2 determines (e.g., via the data analyzer 208) that the vehicle 100 is free and/or otherwise properly moving (e.g., the vehicle 100 has an average velocity that is greater than zero).

In some examples, after the determination at block 1020 or 1022, control of the example method 1000 of FIGS. 10A and 10B returns to the method 900 of FIG. 9.

Figure 11A:
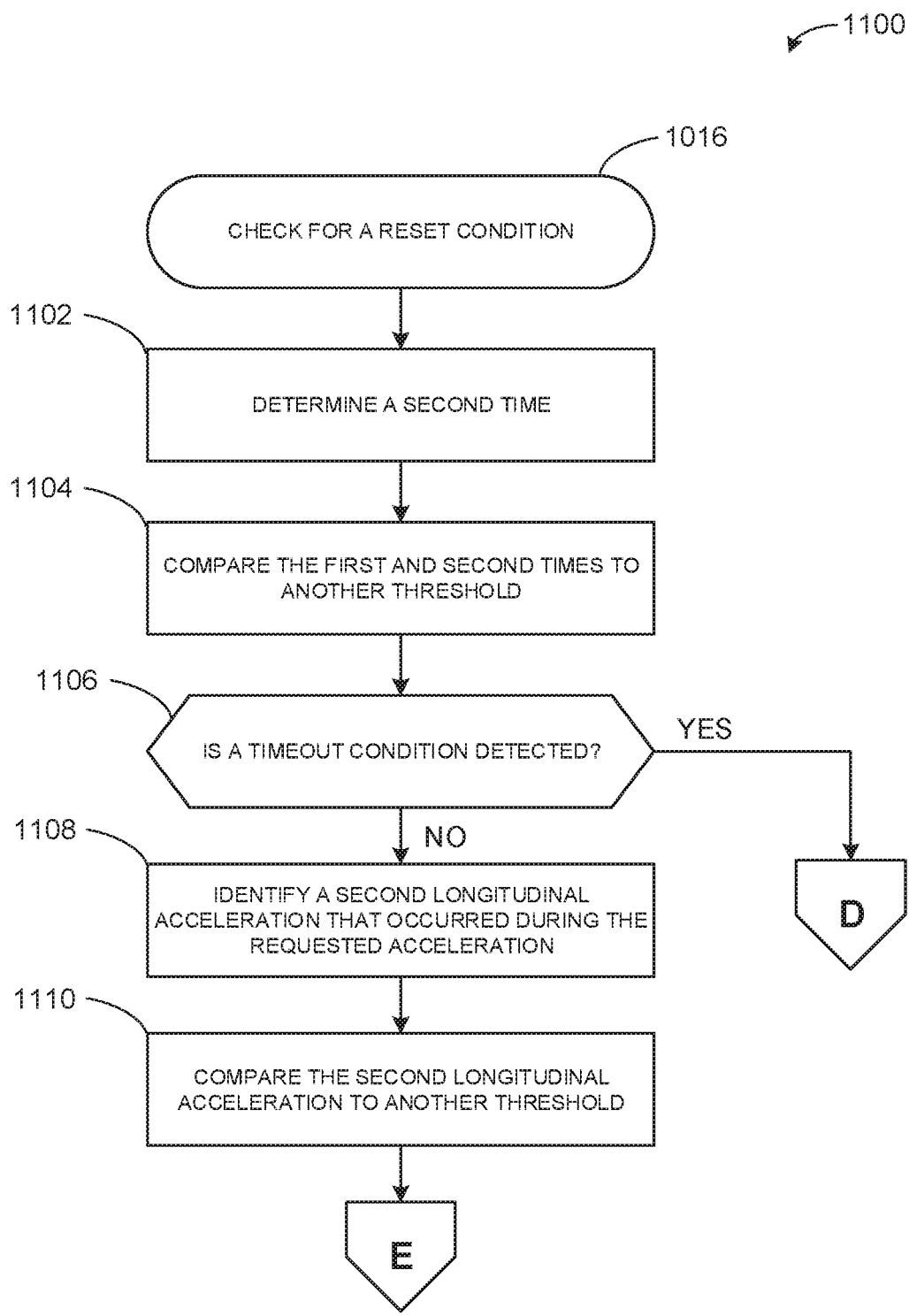
FIGS. 11A and 11B are flow diagrams of an example method that may be executed to implement the example terrain assist system of FIG. 2 to determine whether one or more reset conditions occurred.
Figure 11B:
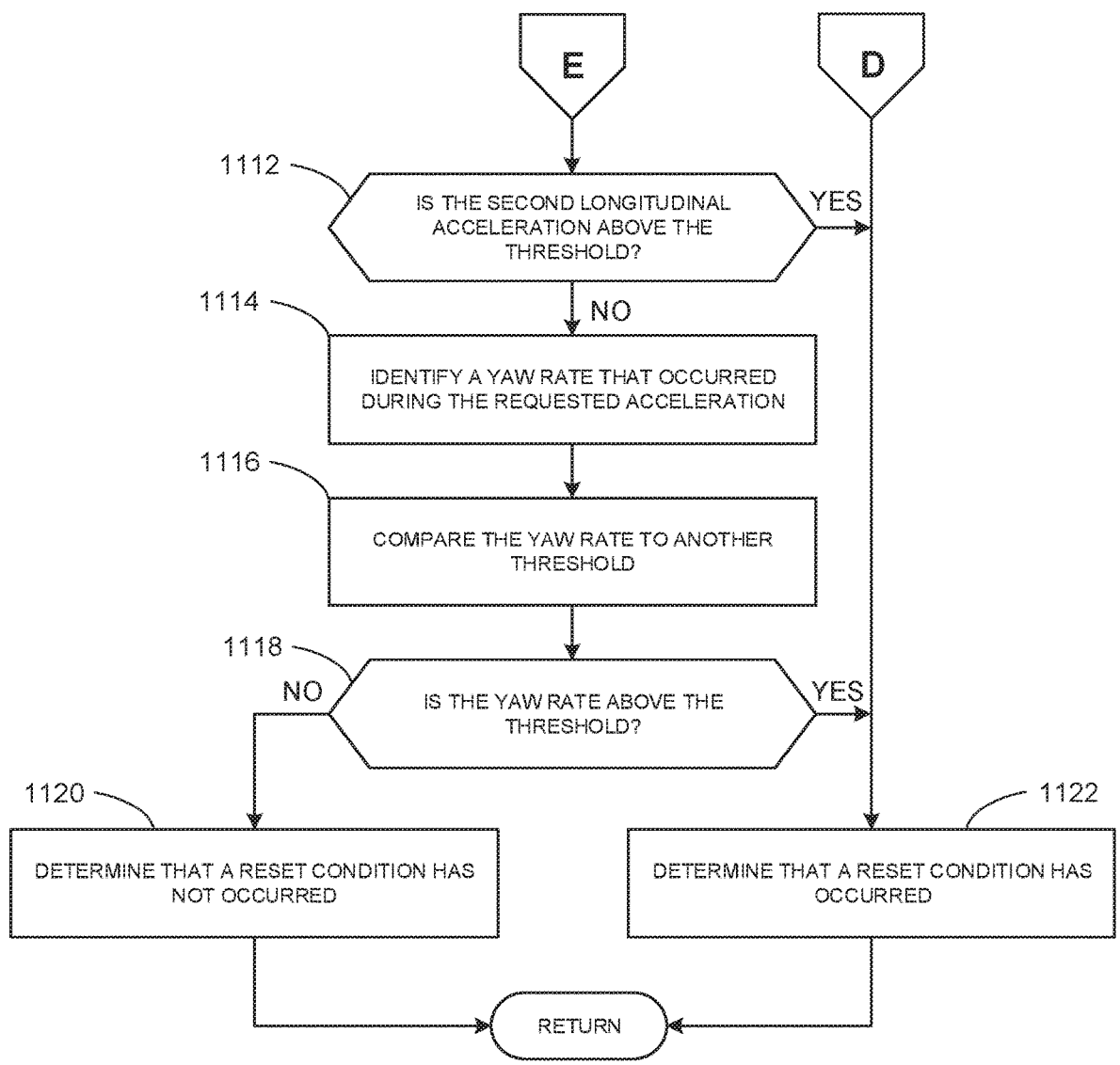

FIGS. 11A and 11B are flow diagrams of an example method 1100 that may be executed to implement the example terrain assist system 200 of FIG. 2. The example method 1100 of FIGS. 11A and 11B can be implemented in any of the example vehicle 100 of FIG. 1, the example controller 102 of FIG. 1, and/or the example terrain assist system 200 of FIG. 2. Example operations of blocks 1102, 1104, 1106, 1108, 1110, 1112, 1114, 1116, 1118, 1120, 1122 may be used to implement block 1016 of FIG. 10B. In particular, the example method 1100 of FIGS. 11A and 11B is effective in determining one or more reset conditions associated with the example method 1000 of FIGS. 10A and 10B. Such reset conditions increase confidence in the determination at block 1020 of FIG. 10B by accounting and/or correcting for false positive determinations.

The example method 1100 of FIGS. 11A and 11B begins by determining a second time (block 1102). In some examples, the example terrain assist system 200 of FIG. 2 determines (e.g., via the data analyzer 208) a second example time that is after the first time determined at block 1005 of FIG. 10A. For example, the second time may be based upon a quantity of ticks of the counter since the counter was initialized at block 1005 of FIG. 10A. In other examples, the terrain assist system 200 generates (e.g., via the data analyzer 208) a second timestamp and/or stores the second timestamp (e.g., in the database 212) to represent the second time.

The example method 1100 of FIGS. 11A and 11B also includes comparing the first and second times to a threshold (block 1104). In some examples, based on the threshold data 218, the example terrain assist system 200 of FIG. 2 compares (e.g., via the data analyzer 208) the first and second times to a fourth example threshold (e.g., a value representing particular time interval). In some examples, the fourth example threshold is a predetermined time interval (e.g., about 20 seconds) within which the example operations of blocks 1006, 1008, 1010, 1012, 1014 of FIGS. 10A and 10B are to be performed.

The example method 1100 of FIGS. 11A and 11B also includes determining whether a timeout condition is detected (block 1106). In some examples, based on the comparison at block 1104, the example terrain assist system 200 determines (e.g., via the data analyzer 208) whether a timeout condition is detected that is associated with the example method 1000 of FIGS. 10A and 10B.

In some examples, when the terrain assist system 200 determines that the timeout condition is detected (block 1106: YES), control of the example method 1100 of FIGS. 11A and 11B proceeds to block 1122. Otherwise, in some examples, when the terrain assist system 200 determines that the timeout condition is not detected (block 1106: NO), control of the example method 1100 of FIGS. 11A and 11B proceeds to block 1108.

The example method 1100 of FIGS. 11A and 11B also includes identifying a second longitudinal acceleration that occurred during the requested acceleration (block 1108). In some examples, based on the sensor data 216, the example terrain assist system 200 of FIG. 2 identifies (e.g., via the data analyzer 208) a second longitudinal acceleration (e.g., different from the first longitudinal acceleration in connection with block 1003 of FIG. 10A) of the vehicle 100 that occurred during the requested acceleration in connection with block 1004 of FIG. 10A.

The example method 1100 of FIGS. 11A and 11B also includes comparing the longitudinal acceleration to another threshold (block 1110). In some examples, based on the threshold data 218, the example terrain assist system 200 of FIG. 2 compares (e.g., via the data analyzer 208) the second longitudinal acceleration of the vehicle 100 to a fifth example threshold (e.g., a value representing a particular longitudinal acceleration).

The example method 1100 of FIGS. 11A and 11B also includes determining whether the second longitudinal acceleration is above the threshold (block 1112). In some examples, based on the comparison at block 1110, the example terrain assist system 200 of FIG. 2 determines (e.g., via the data analyzer 208) whether the second longitudinal acceleration of the vehicle 100 is above the fifth threshold. In some examples, when the terrain assist system 200 determines that the longitudinal acceleration of the vehicle 100 is above the fifth threshold (block 1112: YES) control of the example method 1100 of FIGS. 11A and 11B proceeds to block 1122. Otherwise, in some examples, when the terrain assist system 200 determines that the longitudinal acceleration is below the fifth threshold (block 1112: NO), control of the example method 1100 of FIGS. 11A and 11B proceeds to block 1114.

The example method 1100 of FIGS. 11A and 11B also includes identifying a yaw rate that occurred during the requested acceleration (block 1114). In some examples, based on the sensor data 216, the example terrain assist system 200 of FIG. 2 identifies (e.g., via the data analyzer 208) a yaw rate of the vehicle 100 that occurred during the requested acceleration in connection with block 1004 of FIG. 10A.

The example method 1100 of FIGS. 11A and 11B also includes comparing the yaw rate to another threshold (block 1116). In some examples, based on the threshold data 218, the example terrain assist system 200 of FIG. 2 compares (e.g., via the data analyzer 208) the yaw rate of the vehicle 100 to a sixth example threshold (e.g., a value representing a particular yaw rate).

The example method 1100 of FIGS. 11A and 11B also includes determining whether the yaw rate is above the threshold (block 1118). In some examples, based on the comparison at block 1116, the example terrain assist system 200 of FIG. 2 determines (e.g., via the data analyzer 208) whether the yaw rate of the vehicle 100 is above the sixth threshold.

In some examples, when the terrain assist system 200 determines that the yaw rate of the vehicle 100 is above the sixth threshold (block 1118: YES) control of the example method 1100 of FIGS. 11A and 11B proceeds to block 1122. Otherwise, in some examples, when the terrain assist system 200 determines that the yaw rate is below the sixth threshold (block 1118: NO), control of the example method 1100 of FIGS. 11A and 11B proceeds to block 1120.

The example method 1100 of FIGS. 11A and 11B also includes determining that a reset condition has not occurred (block 1120). In some examples, based on the determination at block 1118, the example terrain assist system 200 of FIG. 2 determines (e.g., via the data analyzer 208) that no reset condition occurred.

The example method 1100 of FIGS. 11A and 11B also includes determining that a reset condition has occurred (block 1122). In some examples, based on at least one determination at block 1106, 1112, or 1118, the example terrain assist system 200 of FIG. 2 determines (e.g., via the data analyzer 208) that at least one reset condition occurred.

In some examples, after performing the example operations of block 1120 or block 1122, control of the example method 1100 of FIGS. 11A and 11B returns to the method 1000 of FIGS. 10A and 10B.

Figure 12:
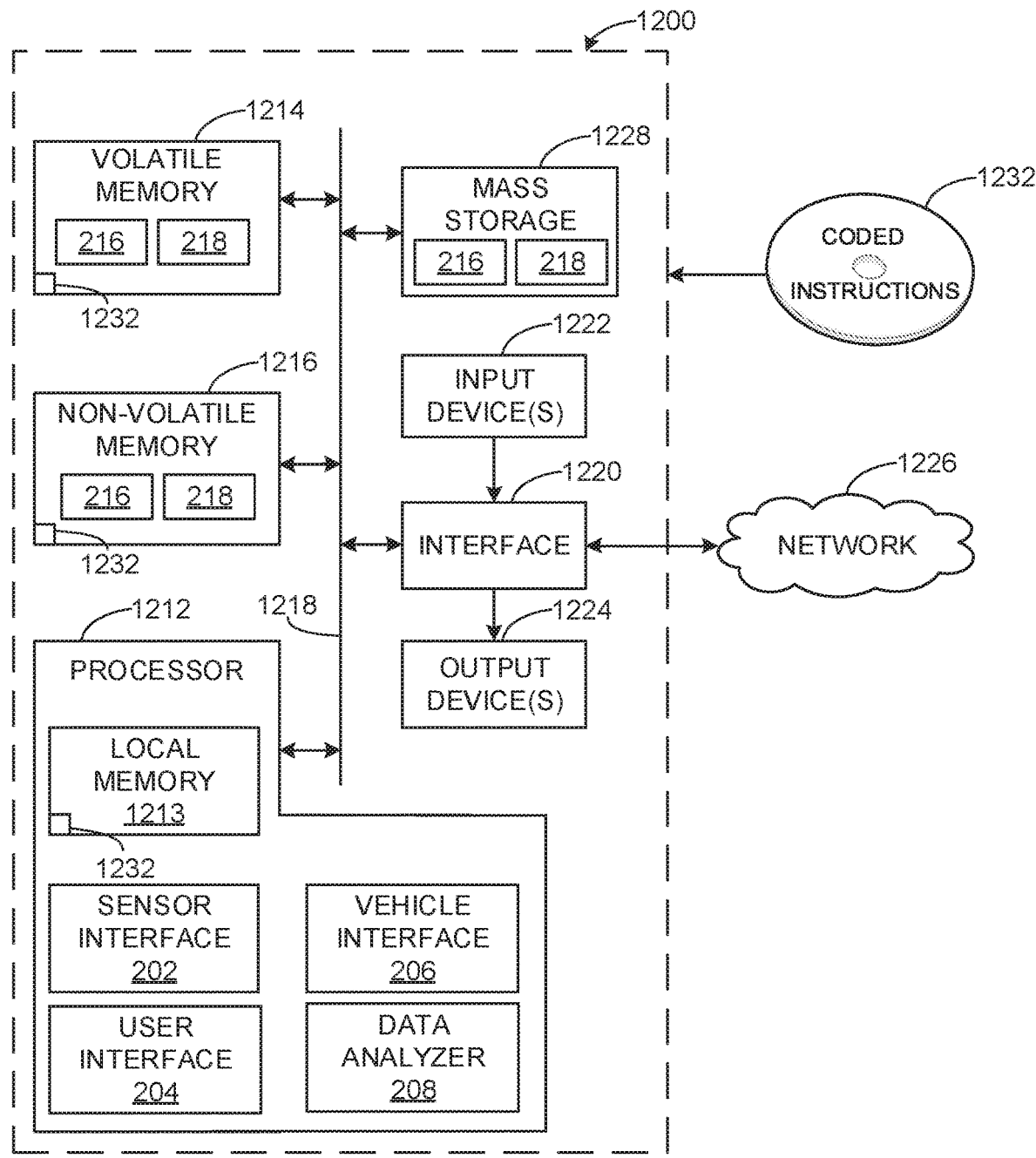
FIG. 12 is a block diagram of an example processing platform structured to execute instructions to carry out the methods of FIGS. 8, 9, 10A, 10B, 11A, and 11B and/or, more generally, to implement the example terrain assist system of FIG. 2.

FIG. 12 is a block diagram of an example processor platform 1200 structured to execute instructions to carry out the example methods 800, 900, 1000, and 1100 of FIGS. 8, 9, 10A, 10B, 11A, and 11B to implement the terrain assist system 200 of FIG. 2. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements the sensor interface 202, the user interface 204, the vehicle interface 206, and the data analyzer 208.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 to carry out the example methods 800, 900, 1000, 1100 of FIGS. 8, 9, 10A, 10B, 11A, and 11B may be stored in the mass storage device 1228, in the volatile memory 1214, in the non-volatile memory 1216, and/or on a removable non-transitory computer readable storage medium such as a CD or DVD.

From the foregoing, it will be appreciated that example apparatus and related methods have been disclosed that assist a driver in moving a vehicle without assistance from another driver and/or vehicle. Disclosed examples determine when the vehicle is stuck in a particular type of terrain and, in response, notifies the driver regarding how to properly operate the vehicle in a manner that frees the vehicle from the surface.

Example 1 includes an apparatus, comprising a vehicle controller configured to determine, based on vehicle sensor data, a condition of a vehicle associated with driving on sand, generate, via an output device, information instructing a vehicle occupant to configure a driving mode of the vehicle that is associated with controlling vehicle speed, and control a parameter of the vehicle based on a setting of the driving mode to resolve the condition.

Example 2 includes the apparatus of example 1, wherein the information includes one or more visual notifications presented via a display in the vehicle.

Example 3 includes the apparatus of example 1, wherein the setting includes a speed of the vehicle, the information instructing the vehicle occupant to set the speed to about 3 miles per hour or less.

Example 4 includes the apparatus of example 1, wherein the information instructs the vehicle occupant to wait for a predetermined time interval, the predetermined time interval based on a characteristic of the vehicle or a terrain on which the vehicle is being operated.

Example 5 includes the apparatus of example 4, wherein the predetermined time interval is ten minutes or less.

Example 6 includes the apparatus of example 1, wherein, in response to detecting a requested acceleration, the vehicle controller is to identify parameters of the vehicle via respective vehicle sensors, compare the parameters to respective thresholds, and determine whether the vehicle is substantially immobile in sand based on the comparisons.

Example 7 includes the apparatus of example 6, wherein the controller is to identify an axle torque or a wheel acceleration that occurred during the requested acceleration, the axle torque or the wheel acceleration to indicate that the vehicle is on a type of terrain that is different from sand when below the respective one of the thresholds.

Example 8 includes the apparatus of example 6, wherein the controller is to identify a wheel deceleration of the vehicle that occurred after the requested acceleration, the wheel deceleration to indicate that the vehicle is on a type of surface that is different from sand when below the respective one of the thresholds.

Example 9 includes the apparatus of example 6, wherein the controller is to identify a longitudinal acceleration or a yaw rate of the vehicle that occurred during the requested acceleration, the longitudinal acceleration or the yaw rate to indicate that the vehicle is substantially immobile when below the respective one of the thresholds.

Example 10 includes an apparatus, comprising a vehicle controller configured to determine that a vehicle is substantially immobile in a terrain based on sensor data, and present a notification to inform a person to activate a driving mode of the vehicle to control vehicle wheel slip on the terrain, and inform the person to change a setting of the driving mode to enable the vehicle to traverse the terrain.

Example 11 includes the apparatus of example 10, further including means for detecting one or more user selections, the controller to inform the person to change the setting in response to detecting a first user selection of the driving mode.

Example 12 includes the apparatus of example 11, wherein the notification is a first notification and in response to detecting a second user selection of the setting, the controller is to present a second notification informing the person to wait.

Example 13 includes the apparatus of example 10, wherein, based on the setting, the controller is to control a parameter of the vehicle for a predetermined time interval.

Example 14 includes the apparatus of example 13, wherein the controller is to cause one or more wheels of the vehicle to slip on the terrain at an angular velocity during the predetermined time interval.

Example 15 includes the apparatus of example 10, wherein the controller is to determine, via a sensor, an axle torque, a wheel acceleration, a wheel deceleration, or a longitudinal acceleration associated with the vehicle, compare the axle torque, the wheel acceleration, the wheel deceleration, or the longitudinal acceleration to a threshold, and determine whether the terrain is sand based on the comparison.

Example 16 includes a tangible machine-readable storage medium comprising instructions which, when executed, cause a processor to at least determine, based on vehicle sensor data, a condition of a vehicle associated with driving on sand, generate, via an output device, information instructing a vehicle occupant to configure a driving mode of the vehicle, and control a parameter of the vehicle based on a setting of the driving mode to resolve the condition.

Example 17 includes the tangible machine-readable storage medium of example 16, wherein the information includes one or more visual notifications presented via a display in the vehicle.

Example 18 includes the tangible machine-readable storage medium of example 16, wherein the setting includes a speed of the vehicle, the information instructing the vehicle occupant to set the speed to about 3 miles per hour or less.

Example 19 includes the tangible machine-readable storage medium of example 16, wherein the information instructs the vehicle occupant to wait for a predetermined time interval, the predetermined time interval based on a characteristic of the vehicle or a terrain on which the vehicle is being operated.

Example 20 includes the tangible machine-readable storage medium of example 16, wherein, in response to detecting a requested acceleration, the instructions further cause the processor to identify parameters of the vehicle via respective vehicle sensors, compare the parameters to respective thresholds, and determine whether the vehicle is substantially immobile in sand based on the comparisons.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a vehicle controller to:
   determine, based on vehicle sensor data, a condition of a vehicle associated with driving on sand;
   generate, via an output device, information to:
   instruct a vehicle occupant to configure a driving mode of the vehicle that is associated with controlling vehicle speed; and
   instruct the vehicle occupant to wait for a predetermined time interval prior to taking a further action, the predetermined time interval based on a characteristic of the vehicle or a terrain on which the vehicle is being operated; and
   control a parameter of the vehicle based on a setting of the driving mode to resolve the condition.

2. The apparatus of claim 1, wherein the information includes one or more visual notifications presented via a display in the vehicle.

3. The apparatus of claim 1, wherein the setting includes a speed of the vehicle, the information instructing the vehicle occupant to set the speed to about 3 miles per hour or less.

4. The apparatus of claim 1, wherein the predetermined time interval is ten minutes or less.

5. An apparatus of claim 1, comprising:
   a vehicle controller to:
   detect a requested acceleration based on vehicle sensor data;
   in response to detecting the requested acceleration, the vehicle controller is to:
   identify parameters of a vehicle via respective vehicle sensors;
   compare the parameters to respective thresholds; and
   determine whether the vehicle is substantially immobile in sand based on the comparisons;
   generate, via an output device, information instructing a vehicle occupant to configure a driving mode of the vehicle that is associated with controlling vehicle speed; and
   control a parameter of the vehicle based on a setting of the driving mode to resolve the substantially immobile condition.

6. The apparatus of claim 5, wherein the vehicle controller is to identify an axle torque or a wheel acceleration that occurred during the requested acceleration, the axle torque or the wheel acceleration to indicate that the vehicle is on a type of terrain that is different from sand when below the respective one of the thresholds.

7. The apparatus of claim 5, wherein the vehicle controller is to identify a wheel deceleration of the vehicle that occurred after the requested acceleration, the wheel deceleration to indicate that the vehicle is on a type of surface that is different from sand when below the respective one of the thresholds.

8. The apparatus of claim 5, wherein the vehicle controller is to identify a longitudinal acceleration or a yaw rate of the vehicle that occurred during the requested acceleration, the longitudinal acceleration or the yaw rate to indicate that the vehicle is substantially immobile when below the respective one of the thresholds.

9. An apparatus, comprising:
a vehicle controller to:
  determine that a vehicle is substantially immobile in a terrain based on sensor data; and
  present a notification to:
    inform a person to activate a driving mode of the vehicle to control vehicle wheel slip on the terrain; and
    inform the person to change a setting of the driving mode to enable the vehicle to traverse the terrain.

10. The apparatus of claim 9, further including means for detecting one or more user selections, the vehicle controller to inform the person to change the setting in response to detecting a first user selection of the driving mode.

11. The apparatus of claim 10, wherein the notification is a first notification and in response to detecting a second user selection of the setting, the vehicle controller is to present a second notification informing the person to wait.

12. The apparatus of claim 9, wherein, based on the setting, the vehicle controller is to control a parameter of the vehicle for a predetermined time interval.

13. The apparatus of claim 12, wherein the vehicle controller is to cause one or more wheels of the vehicle to slip on the terrain at an angular velocity during the predetermined time interval.

14. The apparatus of claim 9, wherein the vehicle controller is to:
determine, via a sensor, an axle torque, a wheel acceleration, a wheel deceleration, or a longitudinal acceleration associated with the vehicle;
compare the axle torque, the wheel acceleration, the wheel deceleration, or the longitudinal acceleration to a threshold; and
determine whether the terrain is sand based on the comparison.

15. A tangible machine-readable storage medium comprising instructions which, when executed, cause a processor to at least:
determine, based on vehicle sensor data, a condition of a vehicle associated with driving on sand;
generate, via an output device, information to:
  instruct a vehicle occupant to configure a driving mode of the vehicle; and
  instruct the vehicle occupant to wait for a predetermined time interval prior to taking a further action, the predetermined time interval based on a characteristic of the vehicle or a terrain on which the vehicle is being operated; and
control a parameter of the vehicle based on a setting of the driving mode to resolve the condition.

16. The tangible machine-readable storage medium of claim 15, wherein the information includes one or more visual notifications presented via a display in the vehicle.

17. The tangible machine-readable storage medium of claim 15, wherein the setting includes a speed of the vehicle, the information instructing the vehicle occupant to set the speed to about 3 miles per hour or less.

18. A tangible machine-readable storage medium comprising instructions which, when executed, cause a processor to at least:
detect a requested acceleration of a vehicle based on vehicle sensor data
in response to detecting the requested acceleration:
  identify parameters of the vehicle via respective vehicle sensors;
  compare the parameters to respective thresholds; and
  determine whether the vehicle is substantially immobile in sand based on the comparisons;
generate, via an output device, information instructing a vehicle occupant to configure a driving mode of the vehicle; and
control a parameter of the vehicle based on a setting of the driving mode to resolve the substantially immobile condition.

* * * * *